Sept. 7, 1954  E. P. G. WRIGHT ET AL  2,688,656
MEANS FOR CHECKING RECORDED INFORMATION
Filed Nov. 24, 1950  19 Sheets-Sheet 9

Inventors
ESMOND P. G. WRIGHT
DONALD A. WEIR
JOSEPH RICE

By
Attorney

Sept. 7, 1954 E. P. G. WRIGHT ET AL 2,688,656
MEANS FOR CHECKING RECORDED INFORMATION
Filed Nov. 24, 1950 19 Sheets-Sheet 17

To Remove/Insert lamp on checker's position.

*Inventors*
ESMOND P. G. WRIGHT
DONALD A. WEIR
JOSEPH RICE

By
*Attorney*

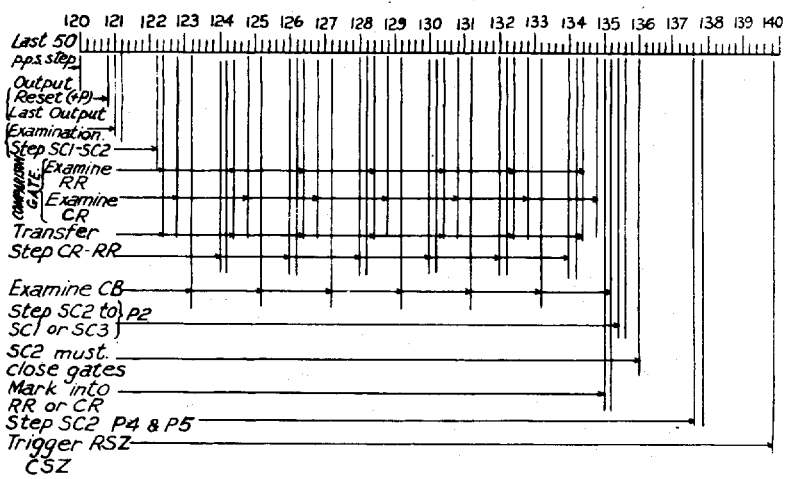

Sept. 7, 1954  E. P. G. WRIGHT ET AL  2,688,656
MEANS FOR CHECKING RECORDED INFORMATION
Filed Nov. 24, 1950  19 Sheets-Sheet 19

FIG. 20.

| CONTROL POSITN No. | SET UP BY | OPERATION BY CHECKER TO GIVE EFFECT | RESULT OF OPERATION. INPUT TO REGISTERS | RESULT OF OPERATION. OUTPUT FROM REGISTERS | NEXT CONTROL POSITION SET-UP |
|---|---|---|---|---|---|
| 0/1 | ACT of SEIZING CIRCUIT | TYPE CHARACTER | CHECKER TO C.R. T. M/C TO R.R. | R.R. TO T.P. | 2/1 |
| 1/1 | 2/1 | TYPE CHARACTER | CHECKER TO C.R. T. M/C TO R.R. | R.R. TO T.P. R.R. TO T. M/C | 2/1 NORMAL 5/3 IF P.O. |
| 2/1 | 1/1 or 6/1 | NONE | C.R. TO R.R. R.R. TO C.R. | R.R. TO C.R., C.R. TO R.R., R.R. and C.R. to COMPARATOR | 1/1 IF AGREEMENT, OR 3/3 IF DISAGREEMENT |
| 3/3 | 2/1 | NONE | LINE FEED MARKED IN C.R. | C.R. TO T.P. | 4/3 |
| 4/3 | 3/3 | NONE | ALARM MARKED IN C.R. | C.R. TO T.P. | 5/3 |
| 5/3 | 4/3 IF DISAGREEMENT 5/2 IF REMOVE OR INSERT 6/1 IF REPEAT P.O. | NONE | | C.R. TO T.P. | 6/1 |
| 6/1 | 5/3 | TYPE CHARACTER | CHECKER TO C.R. | | 2/1 IF NORMAL 5/3 IF P.O. 7/2 IF REMOVE 10/2 IF INSERT |
| 7/2 | 6/1 | NONE | P.O. MARKED IN C.R. | C.R. TO T.P. | 7/3 |
| 7/3 | 7/2 | NONE | | C.R. TO T.P. | 8/1 |
| 8/1 | 7/3 | TYPE CHARACTER | CHECKER TO C.R. | | 8/2 |
| 8/2 | 8/1 | NONE | P.O. MARKED IN R.R. | R.R. TO T.P. | 8/3 |
| 8/3 | 8/2 | NONE | | R.R. TO T.P. | 9/1 OR 5/2 IF ( ) |
| 9/1 | 8/3 OR 9/3 | TYPE CHARACTER | CHECKER TO C.R. T. M/C TO R.R. | | 5/2 IF ( ) 9/2 IF SPACE 10/2 IF QUOTES |
| 9/2 | 9/1 EXCEPT IF ( ) IS TYPED. | NONE | P.O. MARKED IN R.R. | R.R. TO T.P. | 9/3 |
| 9/3 | 9/2 | NONE | | R.R. TO T.P. | 9/1 |
| 10/2 | 6/1 | NONE | P.O. MARKED IN C.R. | C.R. TO T.P. | 10/3 |
| 10/3 | 10/2 | NONE | | C.R. TO T.P. | 11/1 |
| 11/1 | 10/3 OR 11/3 | TYPE CHARACTER | CHECKER TO C.R. | | 5/2 IF QUOTES 11/2 IF NORMAL |
| 11/2 | 11/1 | NONE | P.O. MARKED IN C.R. | C.R. TO T.P. and T M/C | 11/3 |
| 11/3 | 11/2 | NONE | | C.R. TO T.P. | 11/1 |
| 5/2 | 8/1 IF ( ) 9/1 IF ( ) 11/1 IF QUOTES | NONE | P.O. MARKED IN C.R. | C.R. TO T.P. | 5/3 |

Inventors
ESMOND P. G. WRIGHT
DONALD A. WEIR
JOSEPH RICE
By Robert Hardingh
Attorney

Patented Sept. 7, 1954

2,688,656

UNITED STATES PATENT OFFICE 2,688,656

MEANS FOR CHECKING RECORDED INFORMATION

Esmond Philip Goodwin Wright, Donald Adams Weir, and Joseph Rice, London, England, assignors to Standard Telephones and Cables Limited, London, England, a British company Application November 24, 1950, Serial No. 197,208

Claims priority, application Great Britain December 2, 1949

24 Claims. (Cl. 178—23)

1

The present invention relates to means and apparatus for checking information recorded on a recording medium.

Such data may be recorded for use in conjunction with a calculating machine to which the data will be supplied at some time subsequent to the time of recording.

One feature of the present invention comprises apparatus for checking items of information recorded on a recording medium which comprises means for extracting said information from the recording medium, means for comparing said information item by item with a second version of said information and means for giving an indication if said comparison indicates a difference.

Another feature of the present invention comprises apparatus for checking items of information recorded on a recording medium which comprises means for extracting said information from said recording medium, means for comparing said information item by item with a second version of said information, means for re-recording said information after comparison, means for giving an indication if said comparison indicates a difference, means for re-recording the correct version of an item of information for which said comparison means detects a difference and means for amending said information for re-recording by removal, by insertion, or by both removal and insertion of items of information.

Another feature of the present invention comprises apparatus for checking items of information recorded on a recording medium which comprises means for extracting said information item by item from the recording medium, a register controller in which each item so extracted is stored, means for supplying a second version of the information item by item to said register controller for storage therein, means responsive to storage of an extracted item of information and the second version thereof to apply said stored items of information to a comparator forming part of said register controller, means under control of said comparator for giving an indication of a difference if detected, and means for re-recording said information or the correct version thereof after said comparison.

Another feature of the present invention comprises apparatus for checking items of information recorded in printing telegraph code on magnetic tape which compirses a register controller comprising first and second character storage means and comparison means, means for apply-

2 ing a second version of said information to said register controller for storage therein in said first character storage means one character at a time, each of said characters being stored singly in said storage means, means for extracting the recorded information from said magnetic tape character by character to apply it to said register controller for storage in said second character storage means, means for applying said stored characters from both said storage means consecutively element by element to said comparison means, means for giving an indication if a difference has been detected and means for re-recording certain or all of said items of information on said tape after checking.

Another feature of the present invention comprises apparatus for checking information recorded in printing telegraph code on a magentic tape or wire which comprises a register controller comprising first and second character storage means and comparison means, a manually controlled teleprinter for typing second versions of the characters to be checked into the apparatus for storage in said first character storage means, means responsive to receipt of a character from said teleprinter to extract the corresponding character from the magnetic tape and to store it in said second storage means, means for applying said stored characters element by element to said comparison means, means under control of said comparison means for giving an indication if any discrepancy is detected, and means for re-recording each character on said magnetic tape after checking has revealed no discrepancy.

Another feature of the present invention comprises apparatus for comparing two characters in a two condition (mark and space) code which comprises a two condition device, and means for applying said characters to said two-condition device element by element consecutively, in which if corresponding elements of said characters are identical the two condition device is in its first condition at the end of the comparison and if any element of one character differs from the corresponding element of the other character the two condition device is in its second condition at the end of the comparison.

Another feature of the present invention comprises apparatus for detecting a particular character in a two-condition (mark and space) code which comprises a two condition device, means for applying each element of a received character in turn to said two condition device, means for changing the condition of said two condition device if any element or elements of said received character differ from the corresponding element or elements of said particular character, and means operable if said two-condition device does not change its condition to give an indication that said particular character has been received.

The invention will now be described with reference to the accompanying drawings in which:

Fig. 1 is a block schematic of the complete layout of the checking and amending equipment;

Figs. 2 and 3, of which Fig. 3 should be placed to the right of Fig. 2, represent the recorder's time scale;

Figs. 4 and 5, of which Fig. 5 should be placed to the right of Fig. 4 represent the checker's time scale;

Fig. 6 represents the recorder's register;

Fig. 7, which should be placed to the right of Fig. 6 represents the checker's register;

Figs. 8 and 9, of which Fig. 8 should be placed to the left of Fig. 9, represent the sequence controller;

Fig. 19 is an operational time sequence chart; and

Fig. 20 is a table setting out control positions in chronological order, with associated information.

Figure 1:
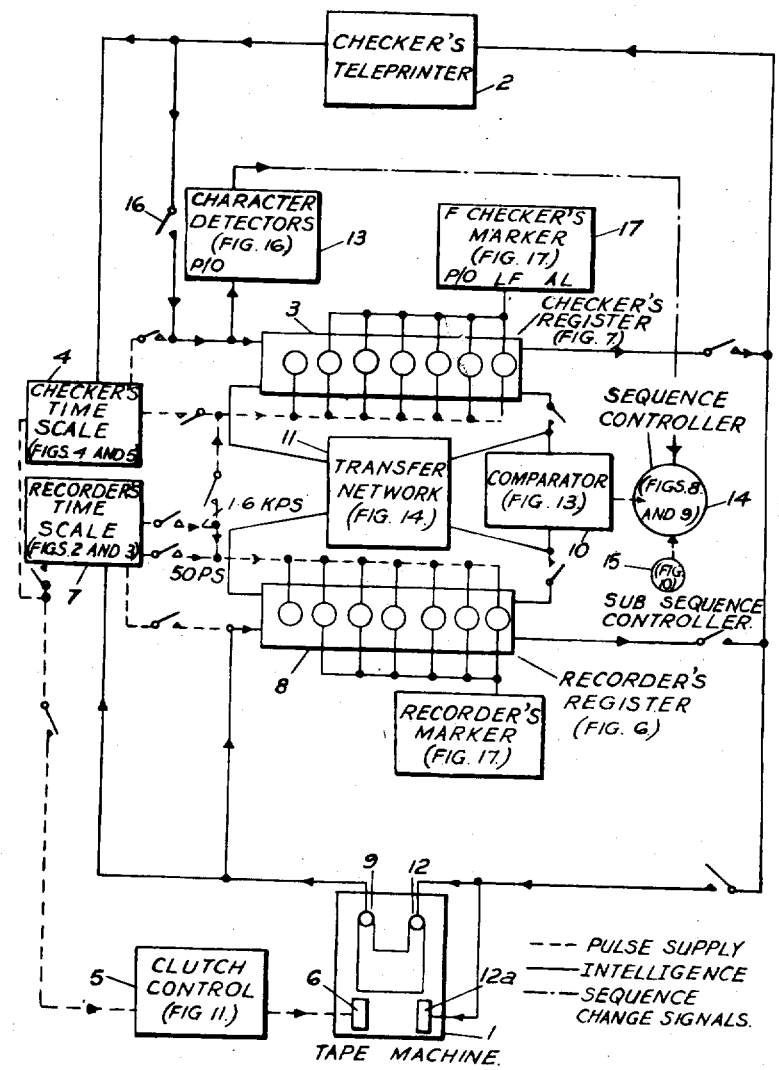

The invention will now be briefly described with reference to the block schematic of Fig. 1. The tape box holding the magnetic tape on which the intelligence to be checked has been recorded in teleprinter code is fitted to the tape machine 1. The checker has a manuscript bearing the data which should be recorded on the tape fitted to machine 1.

Operation is commenced by the tape machine storage unit playing out until the start signal is reached, when the machine stops in this position.

The checker's first action is to depress the start S key on her teleprinter 2, which causes the start character to be sent into the checker's register or storage means 3 and the checker's time scale 4. When the checker depresses a key it always starts the checker's time scale since the checker's teleprinter 2 is connected to the time scale 4 throughout the checking operation. The checker's time scale 4 via clutch control 5 causes the play-out clutch 6 to engage to drive the tape. The tape machine therefore drives and emits its first character which engages the recorder's time scale 7 and permits this first recorded character to be received by the recorder's register or storage means 8. As this signal is being received by the recorder's register 8 the S signal which was marked therein when the circuit was connected (before the checker started to check) is driven out by the incoming signal in a manner to be described later to the checker's teleprinter 2 where it lights a lamp to show that the next character (the first character of the data to be checked) may be sent.

*Normal operation*

Each time the checker depresses a key to put a character (e. g. "a") into the checker's register 3, the play-out clutch 6 is engaged as described above to drive the tape until the next character recorded thereon has been read by the pick-up head 9 and fed, as described above, into the recorder's register 8. When the stop element of the character "a" is detected by character detector 13, automatic means operates to feed the contents of both the registers 3 and 8 to a comparator 10. The characters (the recorded character and that "typed in" by the checker) are automatically compared, element by element, by the comparator 10. The combination of the two register (or storage) circuits and the comparator may be conveniently designated a register controller. While this checking is in progress, the character that was in the checker's register 3 is fed into the recorder's register 8 and that which was in the recorder's register 8 to the checker's register 3 via transfer network 11. Thus the checker's version of the character and the recorder's version of the character are automatically compared and interchanged in the registers. This occurs at a speed high enough not to reduce the speed at which the checker can send characters. The speed used in the present embodiment is a speed of 500 elements per second.

If the two agree the checker can proceed with the next character ("b") and repeat the process. The character "a" still stored in the checker's register 3 is driven out, and replaced by the character "b" typed in by the checker, and as the new character "b" passes from the tape into the recorder's register 8, the previous character "a" stored therein is also driven out. The previous character "a" is fed to the recording head 12 of the tape machine where it releases the play-in clutch 12a so that it is re-recorded on the tape, and to the receiver of the checker's teleprinter 2, ready to be printed when the next character is received thereby. Comparison and transfer of the characters stored in registers 3 and 8 occurs as before, and if they agree the third character ("c") can be sent by the checker.

When the checker depresses a key for the third character "c," this character becomes stored in the checker's register 3 and the next character off the tape becomes stored in the recorder's register 8 as before. The arrival of "c" in the recorder's register 8 drives "b" out and causes it to be re-recorded on the tape and to be sent to the checker's teleprinter to await printing. The arrival of "b" in the checker's teleprinter causes "a"—previously stored there—to be printed.

Thus successive characters are put into the checking equipment by the checker and if they agree with the original recording, are re-recorded on the tape and printed on the proof sheet.

*Print out operation*

Should the checker be in doubt as to what character she has reached, she can find out by depressing the "Print Out" ("P/O") key. When the "Print Out" character enters the checker's register 3 it causes the tape machine 1 to transmit the next character into the recorder's register 8, which drives the previous character typed by the checker (now in the recorder's register 8, as described above) to the teleprinter 2. The character detector 13 detects the fact that "Print Out" has been typed and operates to prevent comparison and transfer in response to the stop element of the character. Instead the "Print Out" character (which is a non-printing character) is sent to the checker's teleprinter where it causes the previous character held there to be printed. Thus the checker sees on her proof sheet the last data character which she had typed, and thus knows the next character to type.

The sequence controller 14, which with the subsequence controller 15, controls the gating circuits (shown in Fig. 1 as contacts) which determine the operation of the circuits, is left after this printing out operation in such a position that the next character received from the checker will not engage the tape machine play-out clutch 6 but will be compared and interchanged with the last character previously received in the recorder's register. Normal operation can then be resumed.

*Procedure following an error*

An error (in the recorded material, by the checker, or both) is indicated by a difference between the character typed in by the checker and that stored on the tape. When the comparator 10 detects such a difference it causes gate 16 (shown as a contact) to open to cut the checker's connection to the checker's register 3.

The character stored in the checker's register 3, the last to be emitted by the tape machine, is driven out to the checker's teleprinter only. When this transmission is nearly completed, the checker's marker 17 marks "Line Feed" (LF) into the register 3, and this also is driven out to the same destination. Near the end of this transmission the checker's marker 17 marks "Alarm" (AL) into the register 3, and this is also played out to teleprinter 2.

Successive receipt by the teleprinter 2 of the disputed character, Line Feed and Alarm causes that character to be printed, the paper to feed and the Alarm signal to be given. The alarm also disconnects the teleprinter circuit from the remainder of the apparatus, and it may only be reconnected when the checker operates a reset push-button, which also cuts off the alarm bell or buzzer. This prevents the checker from making further transmission until she has acknowledged the alarm.

After this, the circuit comes to rest with sequence controller 14 in such a position that if the checker types a character the play-out clutch 6 will not be engaged.

The checker, having observed and acknowledged by resetting, the alarm, peruses the manuscript to see the character disputed. She now types the correct character which passes into the checker's register 3. As the playout clutch 6 is not engaged, nothing passes to the recorder's register 8, which therefore still retains the character previously typed by the checker—the checker's original version of the disputed character which arrived there after comparison in the normal manner. The comparator 10 operates in the usual manner.

If the checker was originally correct, typing the correct character for a second time produces agreement, so that normal operation can be resumed. However, if the checker had made a mistake, the wrong character which she had originally typed will still be in register 8, so that when the correct character is typed a difference is again revealed and her original wrong character is printed, line feed occurs and the alarm operates. The character which she typed the second time is now in the recorder's register. Therefore she must now operate the reset button and type the character again. If what she types on this second repeat agrees with the previously typed character normal operation recommences.

*Removal of information*

When the checker finds that information (represented by several characters) recorded on the tape by the recorder whose work she is checking should not be there, she first sends "Print Out," which (as already described) causes what is on the typehead of teleprinter 2 to be printed. Then she operates the "removal" key, marked "( )" ("brackets"). This character is fed in the usual manner to the checker's register and is also detected by the character detector 13. The character is then automatically driven out of the checker's register 3, and passes therefrom to the checker's teleprinter 2 only, where it is printed. The checker then depresses the space bar. This causes the character already in the recorder's register (brought in by the "Print Out" character as already described) to be automatically driven out to the checker's teleprinter and printed. The removal character "( )" does not engage play-out clutch 6 after the "Print Out" since sequence controller 14 rests in the position in which this function is disabled. Receipt of "( )" signal also causes the sequence controller 14 to assume such a position that "( )" is automatically transmitted to the checker's teleprinter 2, followed by a marked in "Print Out" character. When the checker sends the next space character (by operating the space bar), the character in the recorder's register 8 (received when "P/O" was typed) is transmitted to the checker's teleprinter 2. The sequence controller 14 now moves to a position such that when the checker again sends space a character will be drawn from the tape machine 1 into the recorder's register 8 in the normal manner.

The next space sent by the checker (by operating the space bar again) engages clutch 6 and draws another character into register 8 from which it is driven out to the teleprinter 2 and printed. This continues until the last character to be removed is printed, when the checker for a second time operates the removal key "( )." This character enters the checker's register 3 (and is detected by detector 13) and is driven out to the teleprinter 2 and printed on the proof sheet. At the same time the clutch 6 is engaged and the next character (the one immediately succeeding the last character to be removed) is sent from the tape into the recorder's register 8. At the end of this operation, the apparatus is set so that when the next character (i. e. that which corresponds to the character now in the register 8) is typed by the checker the clutch 6 is not engaged so that no further character is sent from the tape. This new character typed by the checker is therefore compared in the usual manner with the character previously drawn into the recorder's register by the second "( )" character. If the two agree, normal operation is resumed.

Although the same character has been used for both "start of removal" and "end of removal" it would be possible to use different characters for those two functions. In this case the "start of removal" could also serve instead of the space signal to remove each individual character to be removed.

*Insertion of material by the checker*

If the checker observes that some of the original data has not been recorded, and so some information must be inserted, she first "Prints Out" as already described what is in the teleprinter typehead and the recorder's register 8. This sends the next character from the tape into register 8, but the apparatus is set so that the next character typed after the "Print Out" does not engage clutch 6, and nothing further is played off the tape for the time being. Then the checker operates the insertion key, marked ' " ' "quotes"). This character passes into the checker's register and thence to the checker's teleprinter where it is printed. The detector 13 detects this character as it passes into register 3 and controls the sequence controller 14 in such a manner that when the checker performs the next action which is to type the first character to be inserted, that character passes to the checker's register 3 and is automatically driven out and both printed on the proof sheet and recorded on the tape. This process is repeated until all the characters to be inserted have been printed. The checker thus again types the insertion character ' " ' ("quotes") whcih enters and is automatically driven out of the checker's register 3 and printed but not recorded. Circuit changes necessary for this are made by the sequence controller 14 and the sub-sequence controller 15 under control of detector 13. It also sets the circuit so that the next character which the checker sends passes into the checker's register 3 and is automatically compared with the character which was put into the register 8 on the "Print Out" before insertion started.

Although the same character has been used as a "start of insertion" signal and as an "end of insertion" signal, different characters could be used for these functions.

The sequence controller 14 and sub-sequence controller 15 (Figs. 8, 9 and 10) control the gating circuits indicated in Fig. 1 by normally-open contacts. The brief operational description already given indicates which of these "contacts" are open under the various circumstances described.

The detailed circuits will now be described more fully.

The gating circuits used are coincidence detection gate circuits of the type disclosed in U. S. Patent No. 2,498,986 in which a common point is connected over a plurality of rectifiers to a series of other points, and when a given potential is applied to all of those other points that potential appears at the common point. If the potential is not applied to all the other points, it does not appear at the common point.

*The recorder's time scale (Figs. 2 and 3)*

Figure 3:
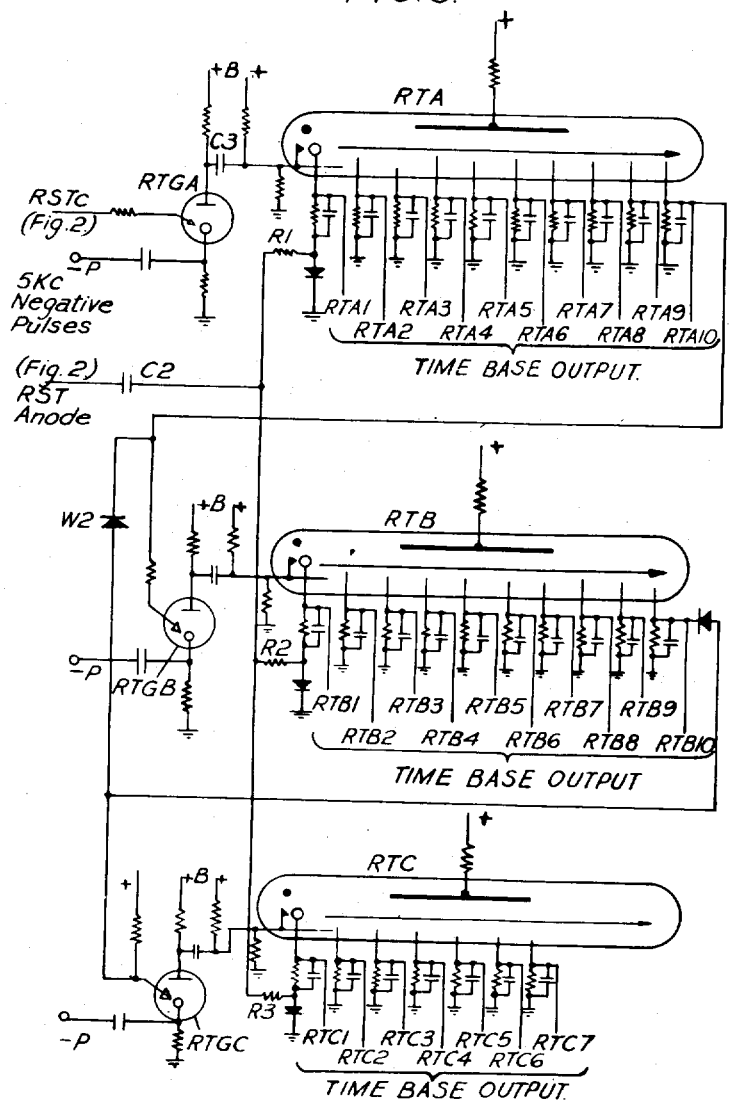

The recorder's time scale is used to give an output at 50 C. P. S., the frequency corresponding to the usual teleprinter speed of 50 bauds. The pulse source from which this output is obtained is a 5 kc. pulse source supplying pulses of both positive and negative polarity simultaneously. The negative pulses P— are applied as shown in Fig. 3 to the cathode of tubes RTGA, RTGB and RTGC.

Figure 11:
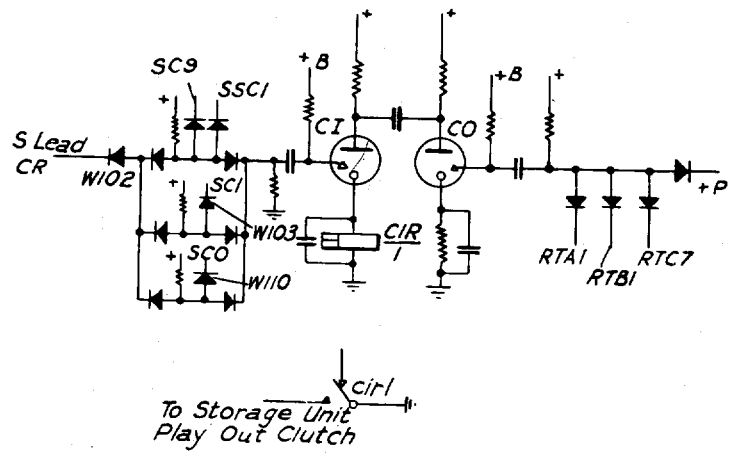
Fig. 11 represents the clutch control circuit.

The circuit is switched on by inserting a plug from the tape machine reproducing head 9 (Fig. 1) in the jack socket JA. As indicated, the ring of the socket goes to the clutch control circuit (Fig. 11). Insertion of the plug in socket JA also closes contacts 20 to operate the "seize" relay S, which at contact s1 connects H. T. supply to all circuits except the registers (Figs. 6 and 7) and during the bunching time of contacts s2 applies positive to the trigger electrode of tube RSZ. This causes RSZ to strike, and via condenser C1 extinguishes tube RST, the start tube (if this is discharging). The purpose of this is to ensure that when operation commences the operation of the recorder's time scale commences from zero.

The connections indicated as going to B+ are connected to a source of positive biassing potential whose voltages is considerably below that of the main H. T. source.

When the first space element arrives on the S lead (a printing telegraph code character has a space element as its start element) and a positive pulse arrives via rectifier W1 during the space element tube RST fires. This is because the coincidence of the positive space signal and the P+ pulse blocks rectifiers W1 and W1a and supplies a positive pulse to the trigger electrode of tube RST over W8 which with the fixed bias B is sufficient to fire the tube. The decrease in anode voltage of RST via C1 extinguishes RST, and via C2 and R1, R2 and R3 applies negative impulses to the cathode of the first gap in each of tubes RTA, RTB and RTC respectively. This causes the first (or rest) gap of each of these multi-gap tubes to fire, which in well known manner extinguishes any other gaps in these tubes which may be discharging. When tube RST fires its cathode potential rises, which rise of potential is applied to the trigger electrode of tube RTGA. When the next P negative pulse arrives the combined effect of these potentials will be sufficient to strike tube RTGA. The negative pulse produced at the anode of this tube is applied via condenser C3 in common to all the trigger electrodes of tube RTA. Since the start gap of this tube is discharging this causes the first gap thereafter to break down and to extinguish the start gap and prepare the next succeeding gap. When the negative impulse P— on the cathode of RTGA ends, tube RTGA is extinguished since its anode is connected to the bias voltage source which cannot maintain it conducting in the absence of cathode pulses. It restrikes on each negative pulse on its cathode during the positive potential on its trigger electrode. Each time RTGA fires it steps RTA along once. When the last gap of RTA is reached and fired, the next gap thereof to be prepared for firing is the first gap as the multi-gap tubes RTA, RTB and RTC are of the type described in U. S. Patent No. 2,553,585 in which the gaps are arranged in a closed circle within the envelope of the tube. The positive potential on the last gap of tube RTA also applies a positive potential to the trigger electrode of tube RTGB.

The next negative pulse (applied to cathodes of tubes RTGB and RTGC as well as to the cathode of RTGA) fires RTGA to step RTA to its first gap, and also fires RTGB which steps RTB from its first to its second gap. Transfer to tube RTC occurs similarly with the exception that, due to rectifier W2 it is necessary for both gaps RTA10 and RTB10 to be discharging when the stepping negative pulse reaches RTGC cathode. It will be noted that RTC only has seven gaps in use, and each gap fires 50 times per second. Outputs are taken from cathodes of all three multi-gap tubes to provide phased pulse sources for purposes which will be described later.

In order that the count (or division) can be re-started when seven gaps of tube RTC have been sequentially fired tube RSZ is fired at this point. This is achieved by firing tube RSZ when the coincidence occurs of gaps RTA9, RTB10 and RTC7 discharging, which blocks rectifiers W3, W4 and W5. When the next positive pulse arrives, it reaches the trigger of RSZ since rectifier W6 is blocked by the positive potential P+;

RSZ therefore fires when W3, W4 and W5 are simultaneously blocked. This resets the circuit as already described.

RST is re-struck to re-start the count on the next start element (space signal) on the S lead and also, for example, when the sequence controller stands on position SC8, which applies a positive pulse to block W7 which allows positive to reach the trigger of RST on the next P+ pulse. In this position, "Print Out" is being marked into the recorder's register (Fig. 6) and the character therein is being sent from the register to the checker, so that control by the recorder's time scale is required.

As indicated, RST will also be fired to start the time scale when the sub-sequence controller (Fig. 10) stands in positions SSC2 and SSC3 and when it stands in position SSC1 when the sequence controller is in position SC8 and tube CST in the checker's time scale (Figs. 3 and 4) is fired. The purposes and use of these positions and the need for the recorder's time scale therein will be described later.

Figure 4:
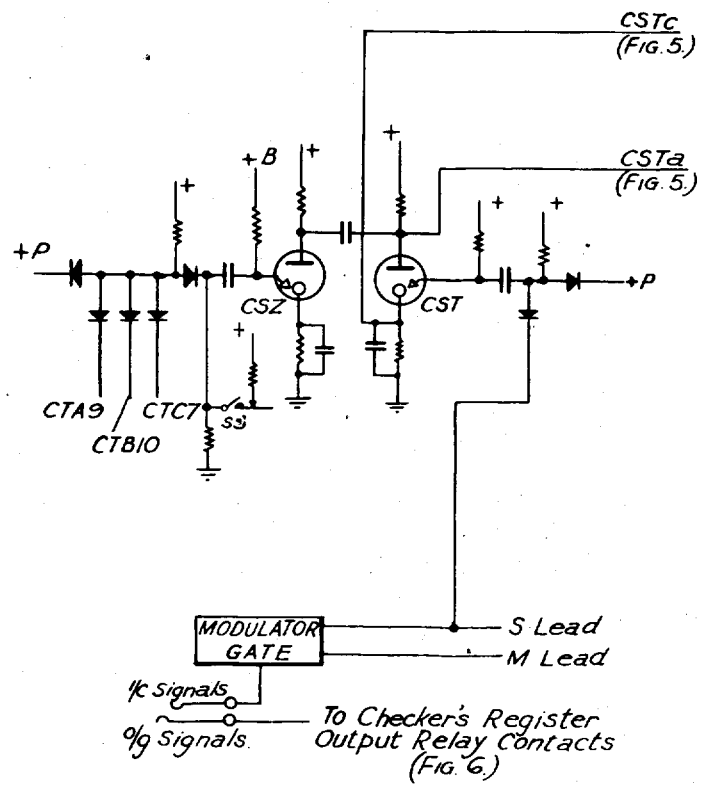
Figure 5:
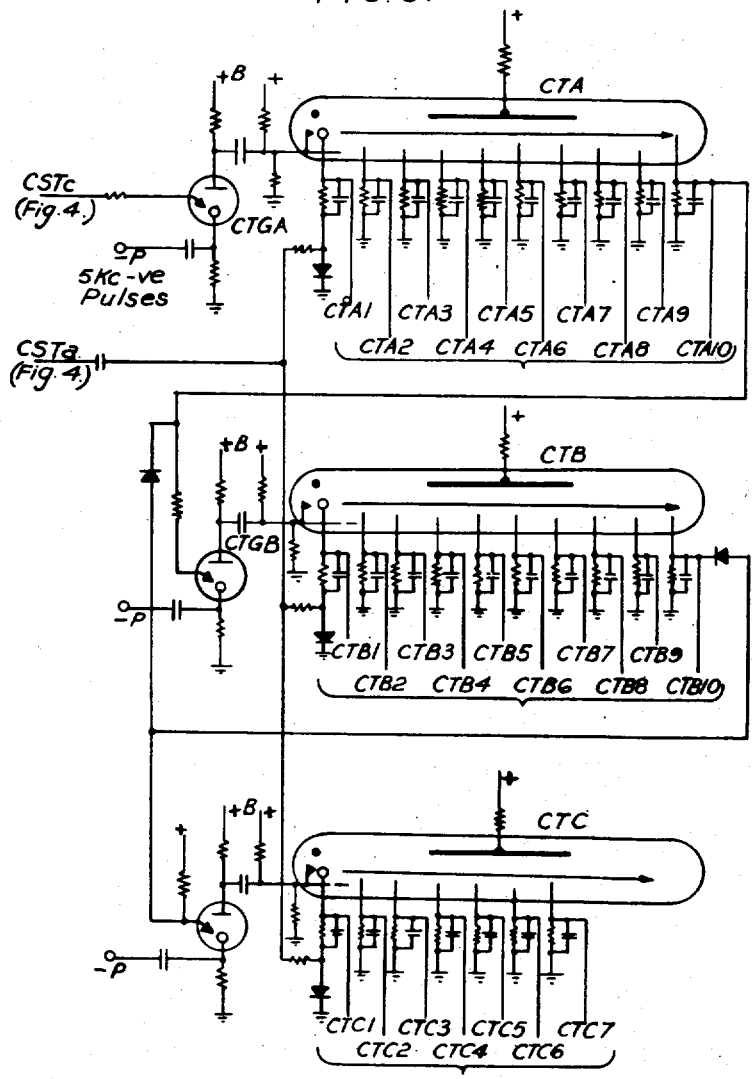

The checker's time scale (Figs. 4 and 5)

The multi-gap tubes CTA, CTB, CTC and their associated circuits are in general identical with the circuits of the recorder's time scale with the exception that the start tube CST is controlled by fewer gate circuits than RST since the checker's time scale is not used as frequently as the recorder's time scale.

Figure 2:
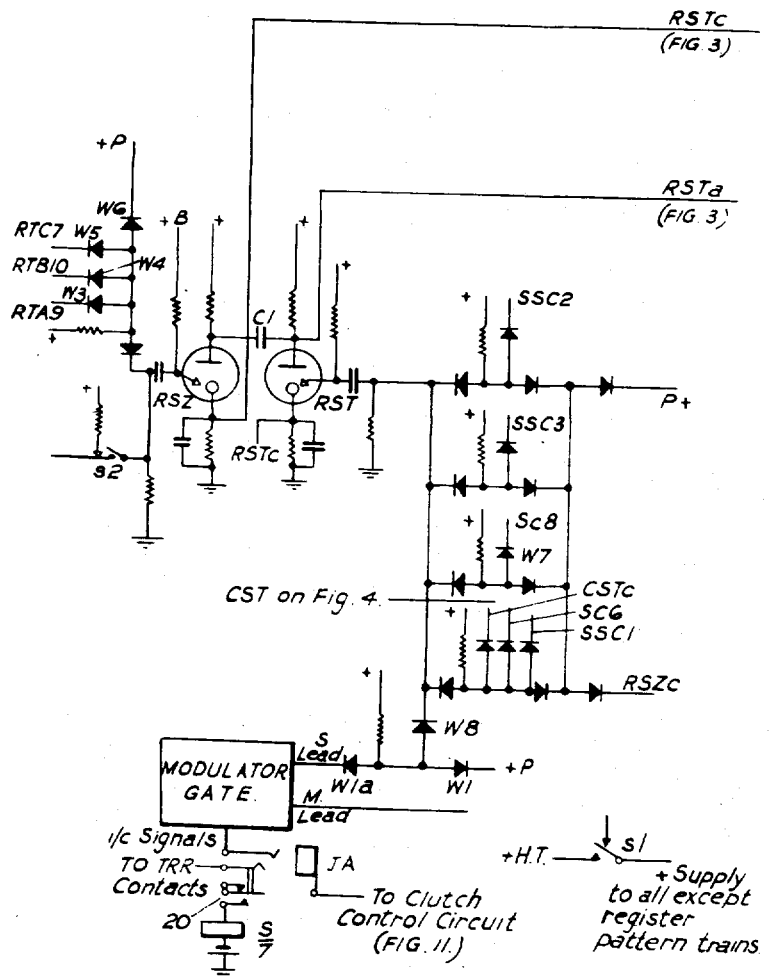

The modulator gates shown in circuits of Figs. 2 and 4 merely function to convert received signals into positive impulses applied to the appropriate leads. Thus if Space-Space-Mark-Space-Space-Space-Mark is received over a plug inserted in jack JC from the checker's teleprinter, the five spaces appear as positive pulses on the S lead in the appropriate time positions and the two marks appear on the M lead as positive impulses in the appropriate time positions.

Figure 6:
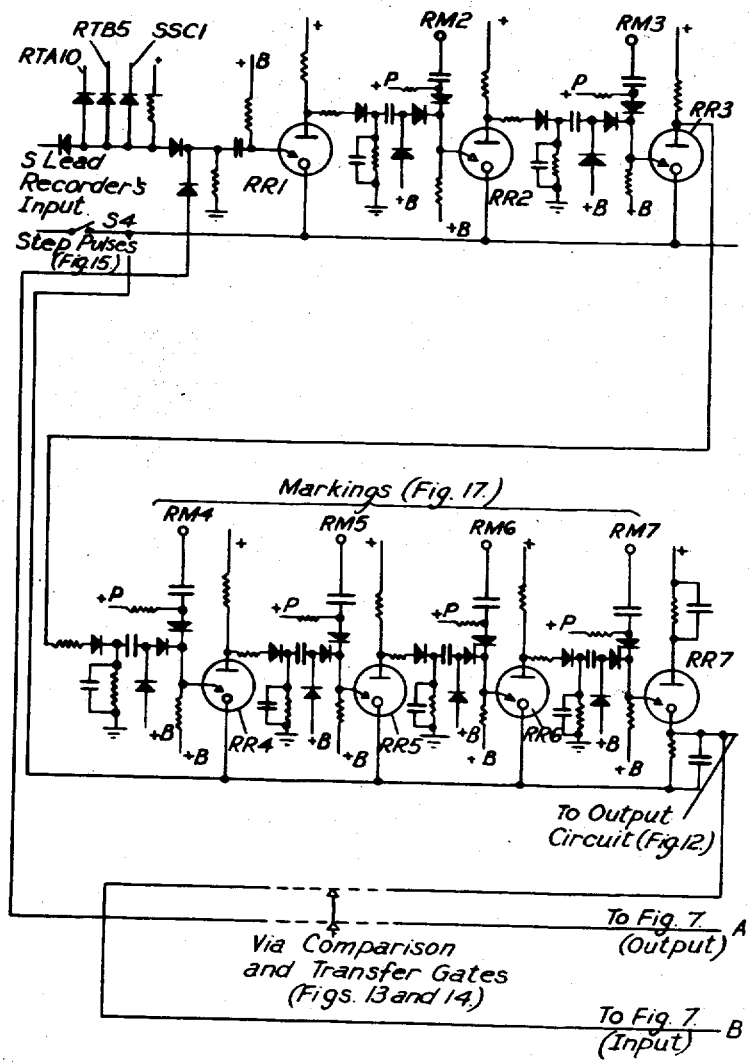

Recorder's register or storage circuit (Fig. 6)

Figure 15:
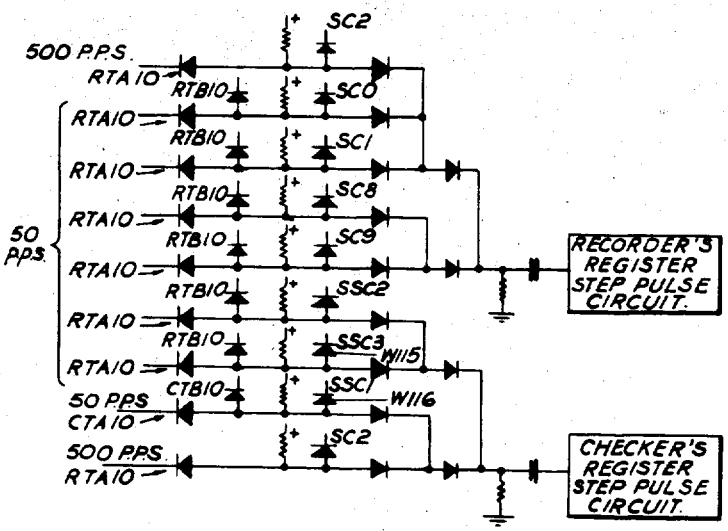
Fig. 15 represents the step-pulse generating and control circuits.

This is a seven-tube chain of what is known as the pattern counter type in which when a combination is set up on the tubes, space elements of the signal being indicated by the tube being struck, if the step pulses (normally at 500 P. P. S.) are applied to the cathodes over contact s4 (closed) the pattern or combination is driven along the chain. It is therefore driven out to the output circuit (Fig. 15). The operational principles of this circuit are fully described in co-pending application No. 147,378 filed March 3, 1950 now U. S. Patent No. 2,649,502 dated August 18, 1953, so it is not necessary to describe the circuit action here.

Certain selected characters (e. g. "Print Out") can be marked into the register by applying positive potentials over such of connections RM2–7 as correspond to the tubes which are to be fired (indicating a space element) for the desired code combination. Tube RR1 is for the stop element, which is always a mark so that no connection is necessary. The selected tubes will then be fired on the next P+ pulse (applied to the trigger electrodes) and all other tubes extinguished. This signal can then be driven out to the output circuit by the step pulses in the usual way.

The gates at the beginning of the chain are closed to permit tube RR1 to fire at the time position indicated (RTA10—RTB5 which occurs at the centre point of each element of the character) and when the sub-sequence controller (Fig. 10) is standing in position SSC1.

Figure 7:
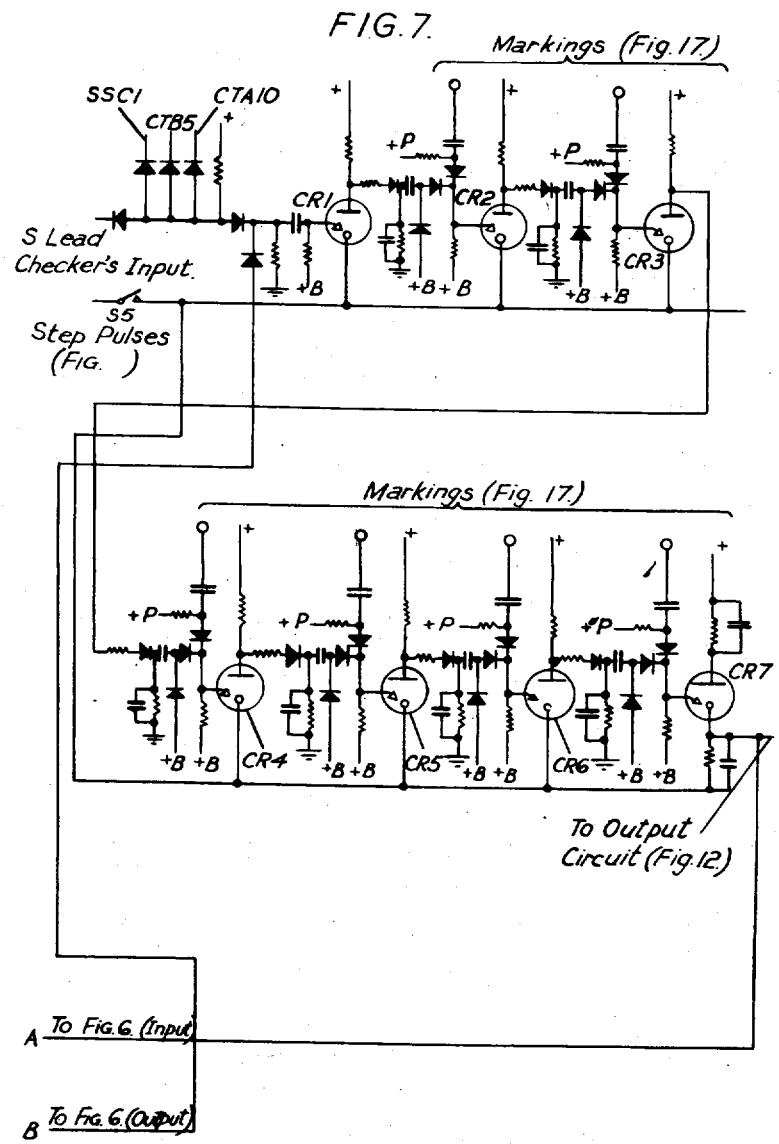

Checkers register and storage circuit (Fig. 7)

This is substantially identical to the recorder's register, so no further description of it is required. It also has connections CM2–7 for marking in selected characters.

The gates at the beginning of the chain are closed to permit tube CR1 to fire at the time position indicated (CTA10—CTB5 which occurs at the centre point of each element of the character) and when the sub-sequence controller (Fig. 10) stands in position SSC1.

As shown in Fig. 6, the output of the recorder's register is connected via the transfer circuit (Fig. 14) to the input of the checker's register (Fig. 7) and the output of the checker's register (Fig. 7) is connected via the transfer circuit to the input of the recorder's register.

Figure 8:
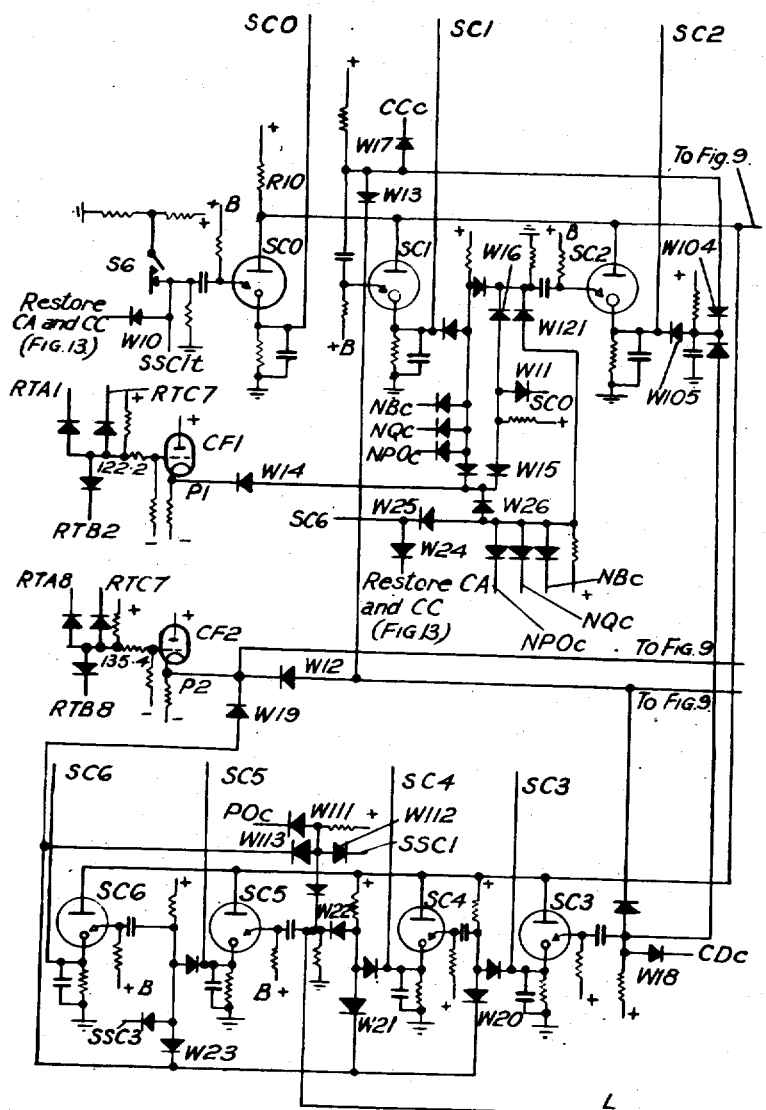
Figure 9:
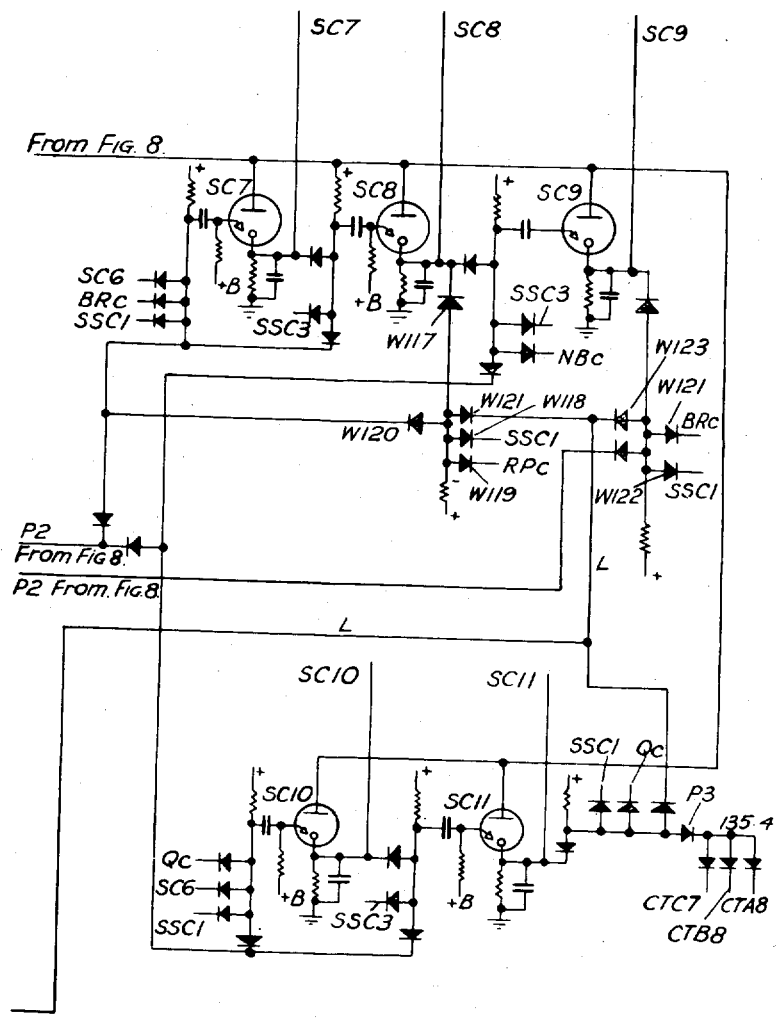

Sequence control circuit (Figs. 8 and 9)

This comprises a series of cold cathode gaseous discharge tubes SC0–SC12 and their associated gate circuits and pulses supplied. SC0 is the start tube, and an operation of relay S (Fig. 2) a positive potential is momentarily applied over contact s6 to its trigger. This fires SC0 and extinguishes any SC tube which happens to be discharging.

During normal checking the sequence controller alternates from SC1 to SC2. Error detection and correction use tubes SC3–SC6 in sequence. SC1, SC2, SC5 and SC6 also serve during Print Out operation. SC1, SC2 and SC5–9 serve during removal of recorded information, while SC1, SC2, SC5, SC6, SC10 and SC11 control insertion of information.

The sequence control circuit will be fully described later during the course of the detailed circuit description so no full description thereof is required at the present stage.

Figure 10:
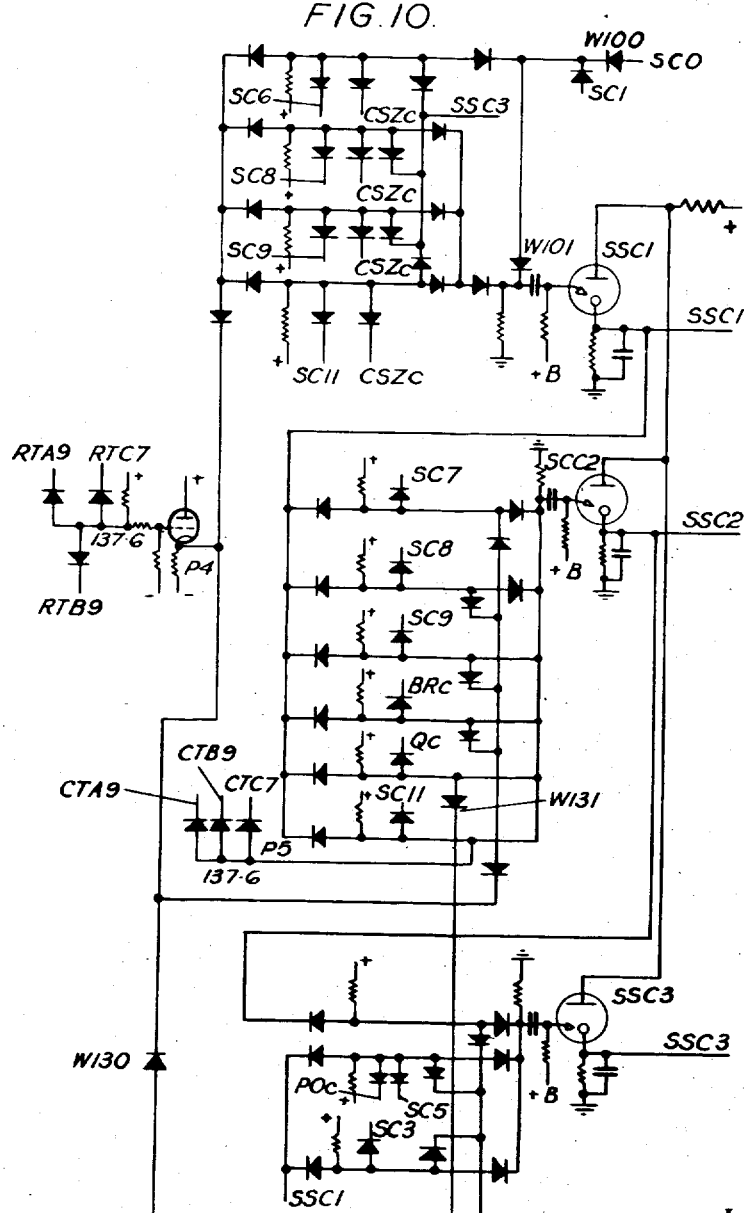
Fig. 10 represents the sub-sequence controller.

Sub-sequence controller (Fig. 10)

This comprises three tubes, SSC1, SSC2 and SSC3 and their associated gates and pulse supplies. Tube SSC1 is normally discharging being fired by a positive pulse from the cathode of either SC0 or SC1 (Fig. 8). The various gate circuits associated with tubes SSC2 and SSC3 and the pulse sources P4 and P5 cause the sub-sequence controller to switch to its second or third position depending on the circumstances. Similarly the return of the circuit to normal is under the control of the gates and pulse sources.

Some of the pulse supplies in Figs. 8, 9 and 10 are derived from the output of a cathode follower. This is necessary in these cases since a large number of gates in parallel are supplied, thus requiring a low impedance output while still retaining a quickly rising pulse.

Clutch control circuit (Fig. 11)

This comprises a binary pair of gas tubes C0 and C1 with a quick acting relay C1R in the cathode circuit of tube C1. It will be seen that with the sequence controller in positions SC0, SC1 and SC9 (with the sub-sequence controller at SSC1), tube C1 is fired (and relay C1R operated) when a positive potential is applied to the space lead for the start element of a character, therefore in these conditions the playout clutch is engaged.

Figure 12:
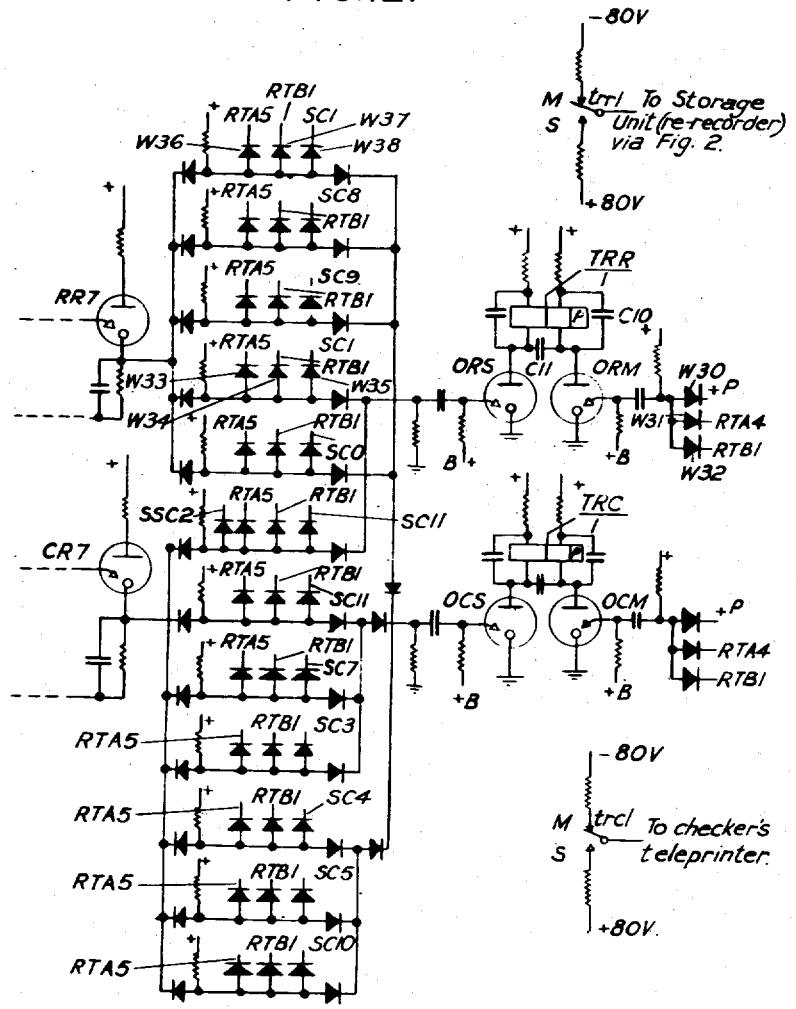
Fig. 12 represents the output circuits for the registers.

Output circuit (Fig. 12)

Each register has an output circuit formed by a binary pair of gas tubes which control a polarised telegraph relay. Considering the output circuit of the recorder's register, it comprises tubes ORS and ORM, whose anode circuits include two windings of the polarised relay TRR, which is normally in its mark position. To ensure that this relay is initially in the mark position, tube ORM is fired over rectifiers W30, W31 and W32 on the P+ pulse at which gaps RTA1, RTB1 of the recorder's time scale are discharging.

When the recorder's time scale steps to its position RTA5, RTB1 the gates between RR7 cathode and ORS trigger are prepared to close and if the sequence control circuit stands in any of the positions indicated the gate controlled thereby closes so that RR7 controls ORS. If RR7 is struck, as it should be for the start element (a space element) when the gates, e. g. W33, W34, W35 are simultaneously closed, positive from RR7 cathode is applied to the trigger of ORS, so relay TRR operates to its space position. Condenser C10 serves to hold the relay in this position until the next element is to be dealt with. After the rectifier W33 unblocks on the stepping of the recorder's time scale the step pulse is fed into the register to move the pattern along, placing the first permutable element of the code combination on tube RR7.

When the time scale next reaches the RTA4, RTB1 position tube ORM does not strike since its anode potential is still maintained low by the condenser across the winding of TRR. On the time scale stepping to RTA5 however, if the element on RR7 is a space element a positive pulse is again passed to the trigger of ORS, but as it is already discharging no change is effected and TRR holds. If, however, there is a mark on RR7, this tube is not discharging and its cathode is at earth potential. When the gates formed by W33, W34 and W35 are closed, a large negative-going impulse is fed to the trigger of ORS which therefore extinguishes. The positive anode impulse via C11 strikes ORM to operate relay TRR to its mark condition.

As each element is stepped through the register, therefore, it controls the output relay via the binary pair of gas tubes. Provision of condensers across the relay windings delays the relay enough for it not to be moved between elements of a signal combination.

The output relay TRC for the checker's register is controlled from the last tube CR7 of the checker's register in exactly the same manner.

When the sequence controller stands in position SC1 (indicating a correct comparison) the recorder's register controls TRR via the circuit above described, and via W36, W37, W38 also controls TRC in exactly the same manner. Further, when the sequence controller in positions SC0, SC8 and SC9 the recorder's register controls the relay TRC only.

The checker's register controls both TRR and TRC if the sequence controller stands at SC11 and the sub-sequence controller stands at SSC2. When the sequence controller stands at SC3, SC4, SC5, SC7 or SC10 the checker's register controls TRC only. If the sequence controller is at SC11 with the sub-sequence controller at SSC1 or SSC3 the checker's register controls only TRC.

*Comparator circuit (Fig. 13)*

The comparator comprises two binary pairs CA, CB and CC, CD of gas tubes which are fed from the registers via gate circuits.

When the checker commences operations by seizing the circuit, the start S character is marked into the recorder's register. The checker then sends start S into the checker's register. Transfer and comparison occur as will be described and the checker sends the first character which will be compared with the character in the recorder's register which was on the tape.

The normal condition in which the circuit stands after a correct comparison is with tubes CA and CC discharging and tubes CB and CD extinguished. Comparison occurs when the sequence controller stands in position SC2.

Comparison will first be described when the element is a space element, and when both elements to be compared agree. In this case the element in question will be represented by a positive potential on the cathodes of both RR7 and CR7, so that the rectifiers W40, W41, W42, W43 connected to these cathodes are blocked. The sequence controller is assumed to be on position SC2 for comparison, so rectifiers W44, W45, W46 and W47 are also blocked. When the recorder's time scale steps to RTA2, rectifiers W48 and W49 are blocked. Therefore on the P+ pulse corresponding to RTA2 a positive potential is applied to the trigger of CB over W50 since W42, W46 and W49 are blocked as has been described, W51 and W52 are blocked by positive potential on the cathode of CA, and W53 is blocked by the P+ pulse. Therefore the positive on RR7 cathode, indicating a space element stored thereon, causes tube CB to fire.

When the recorder's time scale reaches position RTA4, rectifiers W54 and W55 are blocked. As the cathode of CR7 has been assumed to bear a positive potential, indicating a space element stored thereon, rectifiers W41 and W43 are also blocked, as described. W45 and W47 are blocked from SC2, therefore a positive impulse is applied to the trigger of CA over W56 since W41, W45 and W55 are blocked as has been described, W57 and W58 are blocked by the cathode potential of CB and W59 is blocked by the P+ pulse. Therefore a positive impulse appears on the trigger of CA to re-fire it. The refiring of CA indicates that a successful comparison has occurred.

If the element stored in both tubes RR7 and CR7 is a marked signal, rectifiers W40, W41, W42 and W43 are not blocked, so that no change in condition of CA and CB occurs. This also indicates a successful comparison.

If tube RR7 is storing a space and tube CR7 a mark, tube CB fires as described above, but since tube CR7 stores a mark its cathode is at earth potential, so rectifiers W41 and W43 are not blocked. CA is therefore not refired. When the recorder's time scale steps to RTA6, rectifiers W60, W61 and W62 are blocked by SC2, P+ pulse and RTA6 respectively and W63 is blocked by CB cathode potential. CD therefore fires and extinguishes CC to indicate that a discrepancy exists.

If the element stored on RR7 is a mark element, CB is not fired at RTA2. If a space is stored on CR7, however, rectifiers W41 and W43 are blocked, and CB now fires over W64 since W43, W47 and W54 are blocked as has been described, W65 and W66 are blocked by the positive on the cathode of CA, and W67 is blocked by the P+ pulse. Therefore CB fires and on RTA6 causes CD to fire as described above. Thus CD firing again indicates an error.

When CD fires it causes tube SC3 in the sequence controller to discharge which, initiates the error-checking operation. When SC6 fires in accordance with this operation it restores CA and CC and restores the sequence controller to SC2 for a check after the disputed character has been retyped.

*Transfer circuit (Fig. 14)*

This comprises two gate circuits, one extending between the cathode of the last tube of the checker's register and the trigger of the first tube of the recorder's register and one extending between the cathode of the last tube of the recorder's register and the trigger of the first tube of the checker's register. Both of these circuits appear in Fig. 14, but as they are identical in operation only one, the first named, will be described.

It will be seen that when rectifiers W10, W11, W12, W13 and W14 are blocked simultaneously a positive pulse is applied over W15 to the trigger of RR1, the first tube of the recorder's register. This occurs when the sequence controller is at SC2, the recorder's time scale at RTA2, a positive potential on the cathode of CR7 (the last tube of the checker's register), and a P+ pulse received. Tube RR1 then fires. The condition previously stored by tube RR1 will already have been passed down the chain of tubes forming the recorder's register by the stepping pulses. If the signal element stored by CR7 was a mark (the cathode of CR7 then being at earth) the rectifier W13 is unblocked, so no positive pulse is applied to tube RR1. The stepping pulse will by this time have passed the condition stored in RR1 down the chain, so RR1 is unfired, and the mark condition on the cathode of CR7 does not fire it.

The second transfer gate circuit operates in the same manner. The inputs over W16 and W17 are the normal signal input circuits for the registers.

*Step pulse generator gate circuits (Fig. 15)*

Each step pulse circuit is associated with a group of gate circuits, and when one of these gates is closed the step pulse circuit emits one step pulse. It will be observed that both step pulse circuits are triggered when the sequence controller stands at SC2, in which case the pulses are emitted under control of RTA10 of the recorder's time scale. This is the condition for normal comparison operation. At SC1 and SC0 only the recorder's register step pulse circuit operates, this condition being used at the commencement of operations.

It will be seen that when normal comparison is in progress the step pulses are emitted at 500 P. P. S., but under certain other conditions at which step pulses are emitted it is at 50 P. P. S.

*Character detection circuit (Fig. 16)*

This circuit is required to detect character for brackets, quotes, and "Print-Out" when typed by the checker into the checker's register. The purpose of these characters has already been indicated in the brief operational description given with reference to Fig. 1.

The method of character detection adopted is that of detecting the complete absence of the complement of the character. The following table shows the characters, their code combinations and the complementary code combinations.

| Character | Code Combination | Complement |
|---|---|---|
| Brackets ( ) | M M M M S | S S S S M |
| Quotes " | S M M M M | M S S S S |
| Print Out | S M S M M | M S M S S |

Note.—M=Mark and S=Space.

At an early stage in the operating cycle, at CTC1, CTB1, CTA2 and with the subsequence controller at SSC1, the P+ pulse fires tubes BR (the bracket detecting tube), Q (Quotes detecting tube), and PO (Print-out detecting tube).

Brackets detection will first be considered. Tube NB, the "no brackets" detector can be triggered by any one of five gating circuits, one for each permutable element of the character. The gates corresponding to the first four elements are connected to the space lead of the checker's register, so that if any of these elements is a space element, tube NB fires and BR is extinguished. This would indicate that the signal typed into the checker's register was not a brackets character. The gate corresponding to the fifth element is connected to the mark lead of the checker's register so that if this element is a mark, indicating again that the signal is not "brackets," tube NB fires.

Therefore if any element or elements of the signal are different from the corresponding element or elements of the "brackets" signal, tube NB will be fired and BR extinguished at the end of the character. If however, the character is "brackets," none of the gates controlling tube NB are opened and BR is still discharging when the character ends. This condition places a positive potential on the trigger of certain tubes as indicated. The operation caused thereby will be more fully described later.

The "quotes" and "printout" detectors work in exactly the same manner, the gates being appropriately controlled as indicated in the table given above.

*Marking network (Fig. 17)*

As has been described, certain signals, the start S signal, the alarm signal, the print-out signal and the line feed can be marked into the registers, either automatically or by a direct action on the part of the checker.

It is important to remember that the first element of the signal combination, the initial space element, is stored in the last tube (CR7 or RR7) of the register. Therefore in all signals that are marked in it is necessary to fire the last tube.

The start S signal is marked into the recorder's register automatically when the checking circuit is seized by operation of relay S (Fig. 2) which, during the bunching time of contacts s7 applies positive potential to the triggers of tubes RR7, RR5, RR4 and RR2 of the recorder's register. RR7 is fired for the initial space start element and RR1 unfired for the final mark stop element. The start S signal is Mark, Space, Space, Mark, Space.

"Line Feed" is marked in when the recorder's time base stands at RTA6, RTB7, RTC7 and the sequence controller stands at SC3. It will be seen that this only fires tube CR7 since the "line feed" signal is Mark, Mark, Mark, Mark, Mark.

"Print Out" can be marked into either of the two registers. For the recorder's register it is marked in when the recorder's time scale stands at RTA6, RTB7, RTC7 with the sub-sequence controller at SSC2 and the sequence controller at SC8 or SC9. In either of these circumstances when the controlling gate is opened by the appropriate coincidence a positive potential is applied to the grid of cathode follower MCFB. The positive output pulse from MCFB is applied to the trigger electrodes of tubes RR7, RR6 and RR4. This will be seen to give the correct signal, Space Mark Space Mark Mark. For the checker's register the Print Out signal fires tubes CR7, CR6, and CR4. The positive potential to fire these tubes is obtained from the cathode output circuit of cathode follower MCFA. This valve produces a positive pulse output when any one of the gate circuits controlling its grid permits. In all circumstances MCFA gives an output in the same positions of recorder's time scale and sub-sequence controller as does MCFB, but the sequence controller must be in one of positions SC5, SC7, SC10 and SC11.

Alarm is marked in to the checker's register at the same position of the recorder's time scale but at position SC4 of the sequence controller. It will be seen that this fires tubes CR7, CR4 and CR2 (the signal is Mark, Mark, Space, Mark, Space), each via a separate coincidence gate circuit.

When the appropriate coincidence gate circuits detect the required coincidence a positive potential is applied to the selected trigger electrodes of the appropriate register. The selected tubes are fired on the next P+ pulse which also steps the time scale circuit.

Where a signal has to be marked-in in more than one circumstance separate coincidence gates have been provided which control the marking-in via an isolating cathode follower. When the signal is marked-in in only one circumstance this is not necessary. In the latter case when more than one tube has to be controlled, as in the case of "Alarm" a separate coincidence gate is used for each tube controller.

Figure 18:
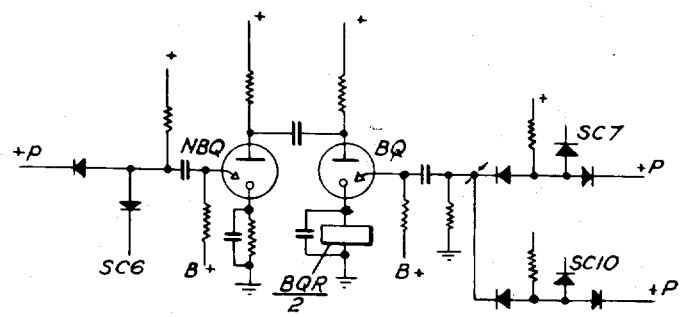
Fig. 18 represents the removal/insertion indicator.

*Remove/insert indicator (Fig. 18)*

This circuit lights the remove/insert lamp at the checker's position if either removal or insertion is in progress. When the sequence controller reaches position SC6, NBQ is fired if not already fired, and BQ is fired in positive SC7 and SC10.

*Figs. 19 and 20*

Fig. 19 is an enlarged time scale and calibrated in milliseconds from 120 to 140 milliseconds from the beginning of the time scale cycle. It covers the duration of the stop element during which all the operations occur.

Fig. 20 is a table setting out the control positions and their functions, causes, relations, and results. The following abbreviations are used.

C. R.=Checker's Register.
R. R.=Recorder's Register.
T. P.=Checker's Teleprinter.
T. M./E.=Tape Machine.
P. O.=Print Out.
( )=Brackets.

In columns 1, 2 and 6 the control positions are given with the sequence controller first and the sub-sequence controller second and after the oblique stroke. Thus 9/3 represents the condition when the sequence controller is at SC9 and the sub-sequence controller at SSC3, and 11/1 represents SC11 and SSC1.

These two figures may be advantageously consulted during perusal of the detailed description.

As the individual portions of the checking apparatus have been described, the operation of checking and operations associated therewith will now be more fully described.

*Start operation*

The seize relay S (Fig. 2) is operated by inserting a plug from the tape machine reproducing head in jack JA (Fig. 2). This closes contact s1 to connect H. T. supply to all tubes except the register trains (connected by the operation of switching on), s2 and s3 to prepare the time scales for operation (Figs. 2–5), s4 and s5 to connect the step pulses to the registers (Figs. 6 and 7), s6 to prepare the sequence controller (Fig. 8) for operation and s7 to mark Start S into the recorder's register. The circuit is therefore ready for use.

It is assumed that the tape whose data is to be checked has been mounted on the tape machine so that the first recorded character, a start S, will be read off immediately the play-out clutch is engaged.

The checker's first action is to send the start S signal. Coincidence of the start (space) element of this signal and a P+ pulse causes CST (Fig. 4) to fire to initiate operation of the checker's time scale (Fig. 5). The start element also blocks W102, which fires CI (Fig. 11) since W110 is blocked from SC0 (Fig. 8). When CI fires, the fast relay CIR operates and at its contact cir1 engages the storage unit playout clutch.

The first character on the tape (a start S signal) is therefore read off, and its start element (space) blocks W1a (Fig. 2) to fire RST which starts the recorder's time scale (Fig. 3). Therefore we have the start S signals from the checker's teleprinter and the tape being simultaneously supplied to the registers. Both registers operate in the same way, so only the checker's register will be considered. At the centre of each signal element (at CTA10, CTB5) the input gate to CR1 is opened, so the character's elements can sequentially control CR1. At CTA10, a step pulse arrives (see Fig. 15), and the combination is fed in and driven along the register train as is fully described in said copending application No. 147,378, now U. S. Patent No. 2,649,502, dated August 18, 1953.

The character from the tape enters the recorder's register in a similar manner under control of the recorder's time scale with the exception that the incoming character (Start S from the tape) drives out the Start S character which was marked therein. Turning now to Fig. 12, it will be seen that with the sequence controller at SC0, this signal is only driven out (via TRC) to the checker's teleprinter, where it lights a lamp to show that the circuit is ready.

In the meantime, at the begining of the stop element (RTA1, RTB2 and RTC7 discharging at 122.2 milliseconds after the cycle started), CA (Fig. 8) produces a P1+ pulse, as already described, which blocks W14 and W15 and fires SC2 over W16 (W11 is blocked from SC0). As already described, firing of SC2 initiates comparison and transfer (Figs. 13 and 14) and when this is complete (it is done at 500 P. P. S., so is done before the checker sends the first data digit) the checker can proceed with the checking if no difference existed. Presence of a difference—i. e. a checker's error sending some signal other than a start S—would sound the alarm as described below.

*Normal operation*

Each time the checker depresses the key to send a character (e. g. "A") from the manuscript into the checker's register, the checker's time scale (Figs. 4 and 5) is started by the start element of the character, the play-out clutch is engaged (Fig. 11) as described under "Start Operation," and the recorder's time scale (Figs. 2 and 3) is started from the start element of the data character on the tape corresponding to "A." These characters are fed into the registers under control of the time positions CTA10, CTB5 and RTA10, RTB5 respectively (each being at the centre of a signal element) and the step pulses. In addition to these characters being driven into the registers, any characters previously stored therein are driven out as described in said co-pending application No. 147,378, now U. S. Patent No. 2,649,502 dated August 13, 1953.

Figure 13:
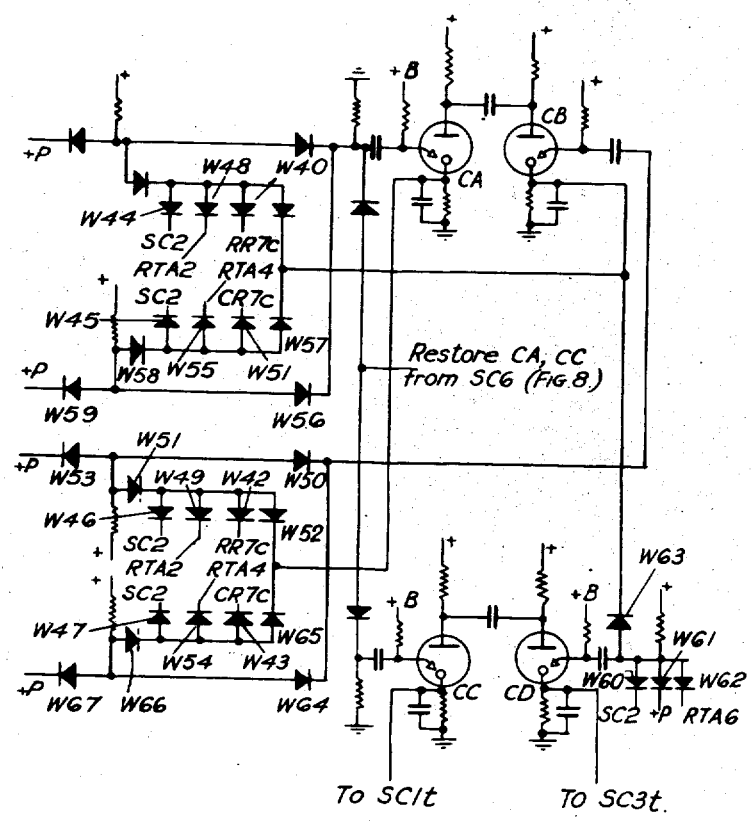
Fig. 13 represents the comparison circuit.
Figure 14:
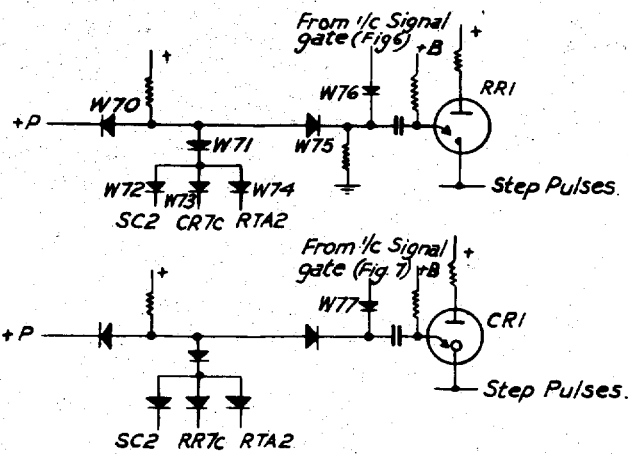
Fig. 14 represents the transfer circuits.

At the beginning of the stop element, actually at 122.2 milliseconds after the recorder's time scale was started, the cathode follower CF1 (Fig. 8) emits the P1 pulse which initiates checking. The immediate result of P1 is, of course to fire SC2 and extinguish SC1. As has already been fully described with reference to Figs. 13 and 14, comparison and transfer occur independently of one another under the control of the recorder's time scale and the step pulse generator. It is assumed that the two agree when compared element by element. Therefore we now have in the checker's register the character which was in the recorder's register and in the recorder's register we have the character which was in the checker's register, with tubes CA and CC of the comparison circuit (Fig. 13) discharging at the end of comparison.

At 135.4 milliseconds, CF2 (Fig. 8) produces the P2 pulse which blocks W12 and W13 to step the sequence controller to SC1 (W104 and W105 are blocked from SC2 and W17 is blocked from CC).

The checker can now proceed to send the next character ("B"), which as before starts the checker's time scale and engages the play out clutch which starts the recorder's time scale.

The character "B" and the corresponding character on the tape are therefore fed into the appropriate registers. The characters already in the registers ("A") are driven out by the incoming characters. Since the sequence controller stands in position SC1, the output of the recorder's register is fed to both the recording head of the tape machine for re-recording on the tape, and to the typehead of the teleprinter. This will be clearly apparent from Fig. 12, in which rectifiers W35 and W38 are blocked from SC1, and rectifiers W33, W34, W36 and W37 are blocked at an early stage in the duration of each signal element (at RTA5, RTB1). There is therefore no output from CR7, so the character previously stored therein is completely expunged.

Again the contents of the two registers are compared and interchanged. If they agree the checker operates a key to send the third character ("C"), which as before is fed into the checker's register and causes the corresponding character to be fed into the recorder's register from the tape. The arrival of character "C" as before drives the character "B" out of both registers, to the tape machine to cause "B" to be re-recorded on the tape, and to the checker's teleprinter where it causes the character previously held in the typehead ("A") to be printed. The sequence controller functions in the same manner as before to control operations.

In this way successive characters are sent by the checker and if each one agrees with the corresponding original recording are re-recorded on the tape and printed on the proof sheet. The sequence controller, as has been described, alternates between positions SC1 and SC2 during this checking operation.

*Printing out operation*

Should the checker be in any doubt as to the last character sent, i. e. what to type next, she can find out by operating the "Print Out" key.

Figure 16:
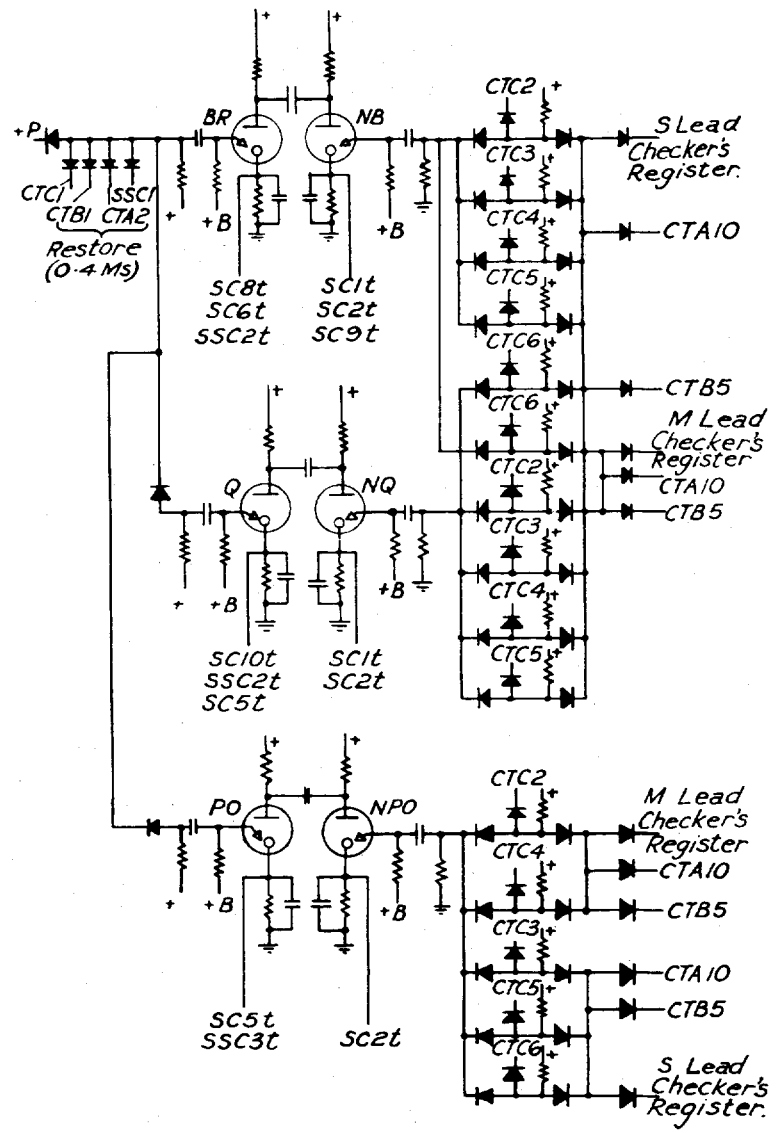
Fig. 16 represents the character detection circuits.

As "Print Out" enters the checker's register it causes, in the usual manner, the tape machine to send the next character into the recorder's register. The character previously typed in by the checker and compared with what was on the tape is driven from the recorders register into the teleprinter. The "print-out" character is detected by the "print out" detector (Fig. 16). As the signal is actually a "print out" signal, none of the gates associated with tube NPO close, so that at the end of the character tube PO is still discharging (tubes NQ and NB will obviously be conducting with tubes Q and BR extinguished). Since tube PO is conducting, rectifier W111 (Fig. 8) is blocked. W112 is blocked from SSC1 in the subsequence controller (Fig. 10), and on the P2 pulse (at 135.4 milliseconds RTA8, RTB8, RTC7) rectifiers W19 and W113 are blocked. Therefore SC5 fires, extinguishing SC1.

In Fig. 10, the sub-sequence controller, SSC3 fires from the coincidence of SSC1, POC and SC5 discharging and the P4 pulse at 137.6 milliseconds, and extinguishes SSC1. Since SC5 is discharging and SC2 quiescent, comparison and transfer functions are disabled.

With SSC3 discharging the recorder's time scale is re-started on the next P+ pulse (see Figs. 2 and 3).

The present condition is therefore with the character last typed re-recorded on the tape and held in the teleprinter typehead, the "Print Out" held in the checker's register. And the next character off the tape held in the recorder's register as the sequence controller stands at SC5 one of the output gates of CR7 (Fig. 12) opens under control of the time scale to cause the character stored in the checker's register (the "Print Out" character) to be driven out. It will be seen from Fig. 15 that when W115 is blocked from SSC3 the step pulses are produced at each coincidence of RTA10, RTB10, which gives a 50 P. P. S. output. From Fig. 12 it will be seen that this character can only control the relay TRC (to the checker's teleprinter), and Fig. 15 shows that the recorder's register step pulse circuit is disabled at this time.

Therefore the "Print Out" character, which is not itself printed, is sent only to the checker's teleprinter where it causes the character held there, the last character typed to be printed. Therefore the checker sees from the proof sheet where she has reached.

At 135.4 milliseconds, the P2 pulse is produced by CF2 and this via W19 and W23 causes Sc6 to fire—SSC3 and SC5 being already discharging. At the end of its cycle the checker's time scale (Figs. 4 and 5) fires tube CSZ to stop the cycle, so SSC1 fires from SSC3 and SC6 the P4 pulse.

The checker's action after printing occurs is to type the next character on her manuscript (i. e. the character corresponding to the one already held in the recorder's register). This starts the checker's time scale (Figs. 4 and 5) as usual, but does not operate the clutch control circuit. This is because (see Fig. 11), not one of SC0, SC1 and SC9 are discharging, so that C1 does not fire. The recorder's time scale is also started (CST, SC6, SSC1 and RSZ discharging together) but no recorder's register step pulses are produced (Fig. 15). However, the checker's register step pulse circuit (Fig. 15) operates in the usual manner as SSC1 blocks W116, its pulse frequency being 50 P. P. S. as it is derived from CTA10, CTB10. Therefore the character is driven into the empty checker's register.

At 122.2 milliseconds, CF1 (Fig. 8) produces the P1 pulse which blocks W14 and fires SC2. This can happen since tubes NB, NQ and NPO are all discharging (see Fig. 16). Thus we now have SC2 and SSC1 discharging, which is the normal condition for comparison and transfer, which accordingly occurs in the usual manner.

Procedure following an error

Should the comparison reveal a discrepancy between recorded and typed in characters, tubes CB and CD (Fig. 13) will be discharging, as has been described with reference to Fig. 13. Therefore the P2 pulse at 135.4 milliseconds (during the cycle in which the discrepancy is detected) fires SC3 since both CD and SSC1 as well as SC2 are discharging at this time. SC3 firing causes SSC3 to fire on the P4 pulse at 137.6 milliseconds. As is usual SC3 and SSC3 firing extinguish SC2 and SSC1.

The fact that SSC3 is discharging causes the recorder's time scale to re-commence a new cycle of operations. The checker's register step-pulse circuit is also prepared for operation, and at the time position RTA10, RTB10 with SSC3 discharging (and hence W115 blocked) the step pulses are produced at 50 P. P. S. and drive the character in the checker's register out. As the sequence controller is at SC3 this character, the disputed character, only goes to the checker's teleprinter via OCS and TRC (Fig. 12).

Figure 17:
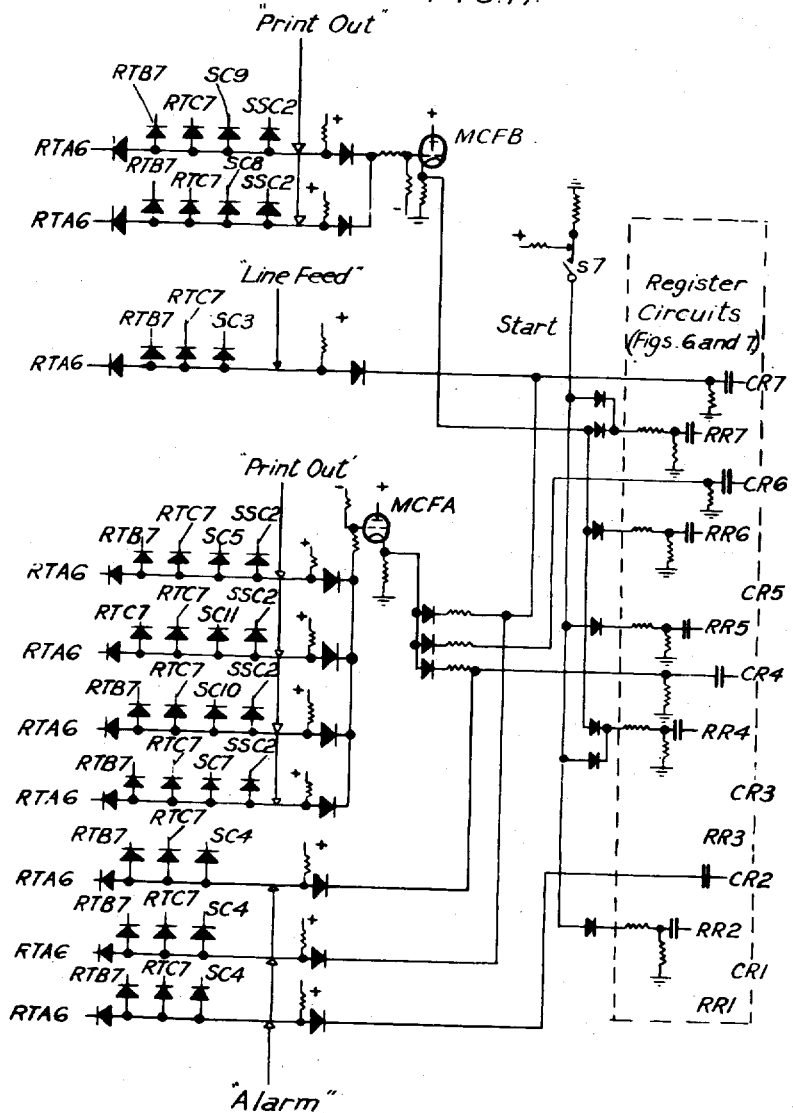
Fig. 17 represents the marking in networks.

Near the end of the cycle, at RTA6, RTB7 and RTC7, "Line Feed" is marked into the now emptied checker's register (see Fig. 17).

On the P2 pulse at 135.4 milliseconds—RTA8, RTB8, RTC7—SC4 fires over W19 and W20 and extinguishes SC3. SSC3 is unaffected by this.

When the recorder's time scale (Figs. 2 and 3) completes its cycle it re-starts since SSC3 is still discharging (see Fig. 2). The checker's register step pulse circuit again operates and drives "Line Feed" out to the checker's teleprinter in the same manner as before. With SC4 discharging CR7 can only control OCS (Fig. 10).

At RTA6, RTB7, RTC7 (SC4 still discharging) "Alarm" is marked into the checker's register. At RTA8, RTB8, RTC7 (135.4 milliseconds) the P2 pulse is generated by CF2 (Fig. 8) and steps the sequence controller to SC5. Once again the subsequence controller is not affected, so we have SC5 and SSC3 discharging.

When the recorder's time scale reaches the end of its cycle it is once again re-started since SSC3 is still discharging, and therefore the checker's register step pulse circuit (Fig. 15) operates as before to drive the "Alarm" signal to the checker's teleprinter. SC5 and SSC3 discharging causes SC6 to fire on the next P2 pulse (135.5 ms.) and SSC1 to fire on the P4 pulse (137.6 ms.) since CSZ is discharging as the checker's register is stationary (Figs. 4 and 5).

Successive receipt by the checker's teleprinter of the disputed character, Line Feed and Alarm causes the disputed character to be printed, the proof sheet paper to feed and the alarm signal to be given to the checker as notice of disagreement. The alarm (not shown) sounds a bell or buzzer and cuts off the checker's circuit to the apparatus; this can only be restored (and the alarm stopped) by operation of the reset key.

With the sequence controller at SC6 and subsequence controller at SSC1, when the checker types the correct version of the disputed character off her manuscript the clutch control circuit (Fig. 11) does not engage the playout clutch. The checker's time scale only starts, and the character is fed into the checker's register under control of 50 P. P. S. step pulses (see Fig. 15).

On the P1 pulse (122.2 milliseconds) SC2 fires and institutes comparison and transfer in the usual manner. If comparison gives no discrepancy, indicating that the checker was originally correct (the checker's version of the disputed character was in the recorder's register when the checker retyped the character into the checker's register) the P2 pulse fires SC1 in the normal manner, and normal operation continues in the manner already described.

However, if the original error was by the checker, the wrong character which she typed was in the recorder's register when this comparison started. The transfer will have put this into the checker's register and when this error is detected by the comparison circuit this wrong character, line feed and alarm are again sent to the teleprinter as already described, and the sequence controller and all other apparatus repeat the "Error" cycle already described. The checker must now retype the character and if this retyping agrees with what she previously typed (now in the recorder's register) normal operation can be resumed.

It will be apparent that an error in the original recording will give one alarm while checker's error will give two alarms.

Removal of information

When the checker finds that information (represented by several characters put in by the recorder) should not be there she first sends "Print Out." This, as described under the heading "Printing Out Operation" causes what is on the teleprinter typehead to be printed leaving the recorder's register with the next character (the first to be removed) stored in it, and the controllers standing at SC6 and SSC1 respectively.

The checker now operates the key marked "( )"— "brackets." This character is fed to the checker's register, and starts the checker's time scale as usual, but as the sequence controller is at SC6 the playout clutch is not engaged. This character is detected by the character detection circuit, so BR (Fig. 16) is discharging when the signal ends. SC7 therefore strikes to the P2 pulse (SC6, SSC1 and BR simultaneously discharging). On the P5 pulse (137.6 ms.) SSC2 fires (see Fig. 10). This causes the recorder's time scale (Figs. 2 and 3) to start and to produce step pulses (see Fig. 15) to drive "brackets" out of the checker's register to the checker's teleprinter (see Fig. 12). Near the end of the cycle, "Print Out" is marked in to the checker's register at RTA6, RTB7, RTC7 with SC7 and SSC2 discharging—see Fig. 17. The P4 pulse at RTA9, RTB9, RTC7 strikes SSC3, and again the recorder's time scale operates to generate step pulses to drive "Print Out" to the checker's teleprinter only where it causes "brackets" to be printed.

On the P2 pulse (135.4 milliseconds) of this cycle (that driving "Print Out" to the checker's teleprinter from the checker's register) SC8 (Fig. 9) fires, and on the P4 pulse (137.6 ms.) SSC3 fires from SSC2. Thus we have now reached SC8—SSC3. This once again restarts the recorder's register (Figs. 2 and 3), which on the P2 pulse steps the sequence controller to SC9 and the sub-sequence controller to SSC1 (CSZ discharging as the checker's time scale is stationary). We have therefore reached SC9, SSC1.

The checker now operates the space bar (after seeing "brackets" printed), and the character enters the checker's register as usual under control of the checker's time scale. As SC9, SSC1 are conducting the play-out clutch control relay CIR (Fig 11) operates, so a character to be removed is fed from the tape to the recorder's register under control of the recorder's time scale. On the P4 pulse SSC2 fires (SC9 and SSC1 already discharging.)

When the cycle ends the checker's time scale stops as usual (CSZ discharging—Fig. 4) but the recorder's time scale re-starts (Figs. 2 and 3) to generate step pulses (Fig. 15) to drive this character from the recorder's register to the checker's teleprinter (see Fig. 12). At RTA6, RTB7, RTC7 (SC9 and SSC2 discharging), MCFB (Fig. 17) marks "Print Out" into the recorder's register. On the P4 pulse the subsequence controller steps to SSC3 (from SSC2). The recorder's time scale is again re-started and generates step pulses (see Fig. 15) to drive "Print Out" to the checker's teleprinter where it prints the character previously driven out of the recorder's register. Meanwhile SSC3 re-starts the recorder's time scale, and the sole effect thereof is to step the sub-sequence controller to SSC1 on the P4 pulse. The controllers have now returned to SC9—SSC1, and removal proceeds therefrom as described.

If the checker types "quotes" in this condition the controller's step to SC10, SSC2, which will be described below.

When sufficient has been removed the checker again sends "brackets." This is fed into the checker's register under control of the checker's time scale as usual, and as the controllers stand at SC9, SSC1 the clutch control operates to bring the next character (i. e. the one immediately after the last removed) from the tape to the recorder's register under control of the recorder's time scale. Since the signal entered in the checker's register is "brackets" BR (Fig. 16) is still discharging when the signal ends. Therefore on the P2 pulse, SC5 (Fig. 8) fires from SC9 over W123 (Fig. 9) and lead L when BR and SSC1 are blocking rectifiers W121 and W122. On the P4 pulse SSC2 fires from SSC1 and BR. Thus we have returned to the SC5, SSC2 condition. SSC2 re-starts the recorder's time scale which produces step pulses to drive "brackets" to the checker's teleprinter, and which at RTA6, RTB7, RTC7 (SC5 and SSC2 discharging) causes MCFA (Fig. 17) to mark "Print Out" into the checker's register. On the P4 pulse, SSC3 fires from SSC2. The recorder's time scale is restarted by SSC3 to generate step pulses to drive "Print Out" to the checker's teleprinter, where it prints "brackets." On the P2 pulse (135.4 ms.) SC6 fires from SC5 and SSC3 and on the P4 pulse SSC1 fires from SSC3, SC6 and CSZ. Thus we have reached SC6, SSC1. In this position when the checker types a character it enters the checker's register under control of the checker's time scale, but the clutch does not engage, and subsequent operation occurs as in the final stage of "Printing Out" and "Error Procedure."

*Insertion of information*

When the checker finds that information has been omitted, and must therefore be inserted, the first operation is to "Print Out" what is on the teleprinter typehead. This, as described under the heading "Printing Out Operation" causes what is on the teleprinter typehead to be printed, leaving the next character (the first one after the required insertion) stored in the recorder's register, and the controller's standing at SC6 and SSC1 respectively. Therefore the next character typed after "Print Out" does not engage the play-out clutch. The recorder's time scale operates, but no recorder's register step pulses are produced. The checker then depresses the insert key marked ' " ' "quotes." This character passes into the checker's register under control of the checker's time scale as usual.

Since this character is "quotes," tube Q is discharging at the end of the signal. Therefore on the P2 pulse, SC10 (Fig. 9) fires from Q, SC6 and SSC1, and on the P4 pulse SSC2 fires over W130 and W131 with Q and SSC1 discharging. We have therefore got SC10, SSC2 discharging.

The recorder's register is re-started by SSC2 (Figs. 2 and 3) and produces step pulses to drive the "quotes" signal in the checker's register to the checker's teleprinter (see Figs. 15 and 12). At RTA6, RTB7, RTC7 with the controllers at SC10 and SSC2 respectively "Print Out" is marked into the checker's register. On the P4 pulse SSC3 fires from SSC2, giving the control position SC10—SSC3.

SSC3 causes the recorder's time scale to re-start and to generate checker's register step pulses to drive "Print Out" to the checker's teleprinter to print "quotes." On the P2 pulse (135.4 ms.), SC11 fires (as SC10 and SSC3 are both discharging), and on the P4 pulse (137.6 ms.) SSC1 fires (since SSC3, SC11 and CSZ are simultaneously discharging). Thus we have reached SC11, SSC1, and "quotes" has been printed.

The checker therefore types the first character to be inserted. This enters the checker's register in the normal manner under control of the checker's time scale. The recorder's time scale is not started, however, and the clutch control not engaged, so no new character is drawn off the tape. On the P5 pulse SSC2 fires from SC11 and SSC1. This (i. e. SSC2 discharging) causes the recorder's time scale to start and to generate step pulses to drive the character in the checker's register out to both checker's teleprinter and tape machine. Recording on to the tape occurs as usual. At RTA6, RTB7, RTC7 (SC11 and SSC2 discharging) MCFA (Fig. 17) marks "Print Out" into the checker's register. The P4 pulse then fires SSC3 from SSC2 (Fig. 10).

Again SSC3 starts the recorder's time scale to produce checker's register step pulses (Fig. 15) which drive "Print Out" from the checker's register to the checker's teleprinter only (see Fig. 12—the checker's register can only feed the recording head when the controllers are at SC11 and SSC2) where it causes the first inserted character to be printed. On the P4 pulse SSC1 fires from SC11, CSZ and SSC3. Typing of further characters for insertion repeats this process—the sequence controller standing at SC11 with the sub-sequence controller going through its cycle once for each character.

When sufficient characters have been inserted (or if "quotes" had been typed in error) the checker again sends "quotes." This character enters the checker's register under control of the checker's time scale, but the recorder's time scale is not started and the clutch control is not engaged. The recorder's register still holds the last character drawn in from the tape, which is the character immediately after the final insertion. As the character is "quotes," tube Q (Fig. 16) is discharging at the end of the cycle. Therefore on the P3 pulse (135.4 ms. at CTA8, CTB8, CTC7) (see Figs. 9 and 8) tube SC5 fires over lead L as SC11, SSC1 and Q are simultaneously discharging. The P5 pulse (137.6 ms. at CTA9, CTB9, CTC7) fires SSC2 (Fig. 10) as SSC1 and Q are discharging. Thus we have reached SC5 SSC2. Operation hereafter proceeds to SC5, SSC3 to "Print Out" "quotes," and then to SC6, SSC1, when the checker types the character which corresponds to the character still held in the recorder's register. Normal operation is resumed thereafter.

While the principles of the invention have been described above in connection with specific embodiments, and particular modifications thereof, it is to be clearly understood that this description is made only by way of example and not as a limitation on the scope of the invention.

What we claim is:

1. Apparatus for checking items of information recorded in a multi-element two-condition code on magnetic tape which comprises a register controller comprising first and second character storage means and comparison means, means for applying a second version of said information to said register controller for storage therein in said first character storage means, means for extracting the recorded information from said magnetic tape character by character to apply it to said register controller for storage in said second character storage means, each of said characters being stored singly in said storage means, means for applying said stored characters from both said storage means consecutively element by element to said comparison means, means for giving an indication if a difference has been detected, and means for re-recording certain or all of said items of information on said tape after checking.

2. Apparatus according to claim 1 and comprising means responsive to detection of a difference to prevent further comparison and re-recording.

3. Apparatus according to claim 2 and comprising means responsive to receipt by the register controller after a difference has been detected of a further version of a disputed character to store said further version thereof and to initiate comparison of said further version of the disputed character with the previously sent version thereof, and means for re-recording the correct character if said second comparison indicates no discrepancy.

4. Apparatus according to claim 3 and comprising means responsive to reception by the register controller of a still further version of a disputed character after a further detection of a difference to cause a further comparison between consecutively sent versions of the disputed character.

5. Apparatus for checking information recorded in a multi-element two-condition code on a magnetic recording medium which comprises a register controller comprising first and second character storage means and comparison means, a manually controlled teleprinter for typing second versions of the characters to be checked into the apparatus for storage in said first character storage means, means responsive to receipt of a character from said teleprinter to extract the corresponding character from the magnetic tape and to store it in said second storage means, the first second version character causing the extraction of the first recorded character, the second second version character causing the extraction of the second recorded character, and so on, means for applying said stored characters element by element to said comparison means, means under control of said comparison means for giving an indication if any discrepancy is detected, and means for re-recording each character on said magnetic tape after checking has revealed no discrepancy.

6. Apparatus according to claim 5 and comprising means for transferring the character extracted from said tape or wire from the second storage means to the first storage means during comparison, means for transferring the second version of the character from the first storage means to the second storage means during comparison, means responsive to detection of a difference to disable said comparison means, means responsive to receipt by the register controller of a further version of the disputed character to store it in said first storage means to replace the character already stored therein, means for comparing said further version of the disputed character with the previously sent version thereof, means for giving a second indication if a discrepancy still exists, and means responsive to two successive applications from the teleprinter to the comparison circuit of the correct version of the disputed character to cause re-recording thereof.

7. Apparatus for checking and amending information recorded in a multi-element two-condition code on a magnetic tape which comprises first and second chains of cold cathode gaseous discharge gaps forming storage circuits, first and second chains of cold cathode gaseous discharge gaps forming time scale circuits, said time scale circuits being controlled by a common impulse source, a manually controlled teleprinter for sending second versions of the characters being checked into said equipment, a first step-pulse generator under control of said first time scale circuit and adapted to generate pulses to drive a second version of a character into said first storage circuit, a play-out clutch responsive to receipt of a second version of a character to be checked to move the tape through a reproducing head through a distance such that the character corresponding to the typed character is extracted from the tape, a second step pulse circuit under control of said second time scale and adapted to generate pulses to drive said extracted character into the second storage circuit, a sequence control circuit comprising cold cathode gaseous discharge tubes adapted in response to the stop element of the second version of said character to connect both said storage circuits to a comparison circuit, means under control of said sequence control circuit to cause pulses from said step pulse circuits to drive the characters stored in the storage circuits element by element to the comparison circuit, means for giving an indication if said comparison circuit detects a difference between said characters, transfer means comprising rectifier gate circuits operable simultaneously with said comparison means to feed the character driven out of the first storage circuit into the second storage circuit and to feed the character driven out of the second storage circuit into the first storage circuit, said sequence control circuit responding to said difference indication to prevent operation of said play-out clutch, the step pulse circuit under control of the first time scale circuit responding to receipt of a further version of the disputed character after an error indication to drive said further version into the first register storage circuit, said sequence control circuit then causing comparison between both typed in versions of the disputed character, and means responsive to a comparison between typed in and extracted characters or between two consecutive typed in characters after difference indication to cause the correct version of the character to be re-recorded on the tape.

8. Apparatus for checking and amending information recorded in a multi-element two-condition code on a magnetic recording medium which comprises a teleprinter for supplying a reference version of the information to be checked and character removal signals, a play-out device for extracting said information from said recording medium character by character, first and second storage circuits, means for inserting a character from said reference version in said first storage circuit, means for inserting the corresponding character from said recording medium in said second storage circuit, a comparator circuit, means for feeding said corresponding characters from said storage circuits to said comparator circuit, an alarm arranged to operate if said comparator circuit detects a difference between corresponding characters, a recording head for recording characters applied thereto on a magnetic recording medium, means for applying a character to said recording head if said comparator gives no indication of difference between that character and the reference version thereof, a detector circuit associated with said first storage circuit and responsive to reception by said first storage circuit of a "start of removal" signal from said teleprinter to disable said comparator and said recording head, a further detector circuit also associated with said first storage circuit and responsive to reception by said first storage circuit of a second removal signal from said teleprinter to extract a character from said recording medium which character is not to be re-recorded, and a still further detector circuit associated with said first storage circuit and responsive to reception by said first storage circuit of an "end of removal" signal from said teleprinter to enable said comparator and said recording head.

9. Apparatus as claimed in claim 8 and which comprises means for sending to said teleprinter for printing thereby all characters which have been checked and re-recorded, including all versions of a disputed character, and all characters removed, if any.

10. Apparatus according to claim 8, and in which each said detector circuit comprises an electronic flip-flop of the bistable type, first and second input leads to said flip-flop so arranged that a code element of a first condition causes a potential condition on said first input lead and a code element of a second condition causes a potential condition on said second input lead, connections between said flip-flop and said input leads which are each individual to one element of a character being received and which each connect said flip-flop to the input lead which would bear said potential condition if the code element momentarily being received differs from what it should be for the character to be detected, means responsive to any code element of a character being received differing from the corresponding code element of the character to be detected to cause said flip-flop to assume its second condition whereby if the character to be detected is received said flip-flop is maintained in its first condition, and means responsive to said flip-flop being in its first condition after reception of a character to indicate that that character has been received.

11. Apparatus for checking and amending information recorded in a multi-element two-condition code on a magnetic recording medium, which comprises a teleprinter for supplying a reference version of the information to be checked, character insertion signals and characters for insertion, a play-out device for extracting said information from said recording medium character by character, first and second storage circuits, means for inserting a character from said reference version in said first storage circuit, means for inserting the corresponding character from said recording medium in said second storage circuit, a comparator circuit, means for feeding said corresponding characters from said storage circuits to said comparator circuit, an alarm arranged to operate if said comparator detects a difference between corresponding characters, a recording head, for recording characters applied thereto on a magnetic recording medium, means for applying a character to said recording head if said comparator gives no indication of difference between that character and the reference version thereof, a detector circuit associated with said first storage circuit and responsive to reception by said first storage circuit of a "start of insertion "signal from said teleprinter to disable said play-out device and said comparator, means responsive to reception by said first storage circuit after said disabling of characters for insertion to apply said characters to said recording head, and a further detector circuit associated with said first storage circuit and responsive to reception by said first storage circuit of an "end of insertion" signal to enable said play-out device and said comparator.

12. Apparatus as claimed in claim 11 and which comprises means for sending to said teleprinter for printing thereby all characters which have been checked and re-recorded, including all versions of a disputed character, and all characters inserted, if any.

13. Apparatus according to claim 11, and in which each said detector circuit comprises an electronic flip-flop of the bistable type, first and second input leads to said flip-flop so arranged that a code element of a first condition causes a potential condition on said first input lead and a code element of a second condition causes a potential condition on said second input lead, connections between said flip-flop and said input leads which are each individual to one element of a character being received and which each connect said flip-flop to the input lead which would bear said potential condition if the code element momentarily being received differs from what it should be for the character to be detected, means responsive to any code element of a character being received differing from the corresponding code element of the character to be detected to cause said flip-flop to assume its second condition whereby if the character to be detected is received said flip-flop is maintained in its first condition, and means responsive to said flip-flop being in its first condition after reception of a character to indicate that that character has been received.

14. Apparatus for checking items of information recorded in a multi-element two-condition code on a recording medium which comprises means for extracting said information character-by-character from said medium, means for supplying a reference version of said information to said apparatus character-by-character, means for applying corresponding characters of said recorded information and said reference version to respective input circuits to an electronic flip-flop circuit of the bistable type, said characters being applied element by element consecutively with corresponding elements of two characters momentarily being compared simultaneously applied to said two input circuits, means for examining the condition of the elements of the two characters momentarily being compared one after the other, means responsive to an applied element of one condition, for example, space, to change said flip-flop circuit from the condition in which it is standing to its other condition, whereby if both elements being compared are identical the flip-flop circuit is in the same condition after said examination as it was before said examination, means responsive to said flip-flop circuit being in its second condition after said examination to indicate that the characters being compared differ, and means for re-recording each character for which no difference indication is given.

15. Apparatus according to claim 14, and in which a succession of insertion signals may be sent to said apparatus, and which comprises means responsive to said signals to cause additional information to be inserted on said recording medium without comparison.

16. Apparatus for checking information recorded in a multi-element two condition code on a magnetic recording medium, which comprises a teleprinter for supplying character-by-character a reference version of the information to be checked, a first storage circuit, means responsive to reception of a character of said reference version to insert that character in said first storage circuit, a play-out device for extracting character-by-character from said recording medium the information to be checked, a second storage circuit, means responsive to reception of a character of said reference version to cause said play-out device to extract from said recording medium the corresponding character of the information to be checked, the first reference version character causing the extraction of the first recorded character, the second reference version character causing the extraction of the second recorded character, and so on, means responsive to the extraction from said recording medium of a character to insert said extracted character in said second storage circuit, a comparator circuit, means for feeding the pair of corresponding characters in said storage circuits to said comparator circuit, an alarm device under control of said comparator circuit and adapted to operate if said comparator detects a difference between a pair of characters applied thereto, a recording device for recording characters applied thereto on a magnetic recording medium, and means under control of said comparator circuit for applying a character to said recording device if said comparator circuit does not detect a difference between the pair of corresponding characters which includes that character.

17. Apparatus for checking information recorded in a multi-element two-condition code on a recording medium, which comprises means for supplying character-by-character a reference version of the information to be checked, first storage means, means responsive to reception of a character of said reference version to insert that character in said first storage means, means for extracting character-by-character from said recording medium the information to be checked, second storage means, means responsive to reception of a character of said reference version to cause said extraction means to extract from said recording medium the corresponding character of the information to be checked, the first reference version character causing the extraction of the first recorded character, the second reference version character causing the extraction of the second recorded character, and so on, means responsive to the extraction from said recording medium of a character to insert that character in said second storage means, a comparator, means for feeding the pair of corresponding characters in said recording means to said comparator, an alarm device under control of said comparator circuit and adapted to operate if said comparator detects a difference between a pair of characters applied thereto, means for recording characters applied thereto on a recording medium, and means under control of said comparator for applying a character to said recording means if said comparator does not detect a difference between the pair of corresponding characters which includes that character.

18. Apparatus for checking information recorded in a multi-element two condition code on a recording medium, which comprises means for supplying a reference version of the information to be checked, means for extracting character-by-character from said recording medium the information to be checked, first and second storage means, means for inserting a character of said reference version in said first storage means, means for inserting the corresponding character of the information to be checked after extraction thereof from said recording medium in the second storage means, a comparator, means for feeding the corresponding characters from said first and said second storage means to said comparator, an alarm arranged to operate if said comparator detects a difference between a pair of characters applied thereto, recording means for recording characters applied thereto on a recording medium, means for applying a character to said recording means if the comparator detects no difference between that character and the reference version thereof, means responsive to detection of a difference by said comparator to disable said extraction means, storage means to which a further version of the disputed character is applied, means for applying said further version and said reference version of the disputed character to said comparator, and means for applying the character to said recording means if said further version and said reference version are identical.

19. Apparatus for checking items of information recorded in a multi-element, two-condition code on magnetic tape which comprises a register controller comprising first and second character storage means and comparison means, a manually controlled teleprinter for applying a second version of said information to said register controller for storage therein in said first character storage means, means for extracting the recorded information from said magnetic tape, character-bycharacter, to apply it to said register controller for storage in said second character storage means, each of said characters being stored singly in said storage means, means for applying said stored characters from both said storage means consecutively, element by element, to said comparison means, means for giving an indication if a difference has been detected, means for re-recording certain or all of said items of information on said tape after checking, said manually controlled teleprinter being adapted to send a succession of removal signals, and means at said register controller for responding to said signals to cause a character or characters to be extracted from said magnetic tape without comparison or re-recording.

20. Apparatus according to claim 19 and which comprises means responsive to a start of removal signal for disabling said comparison and re-recording, and means responsive to an "end of removal" signal for enabling said comparison and re-recording.

21. Apparatus as claimed in claim 20 and in which each character which has been extracted from the recording medium or wire and has been checked is printed on a teleprinter.

22. Apparatus as claimed in claim 21 and in which when a discrepancy has been detected, both versions of said character are printed by said teleprinter.

23. Apparatus for checking information recorded in a multi-element, two-condition code on a magnetic recording medium which comprises a teleprinter for supplying a reference version of the information to be checked, a play-out device for extracting said information from said recording medium, character-by-character, first and second storage circuits, means for inserting a character from said reference version in said first storage circuit, means for inserting the corresponding character from said recording medium in said second storage circuit, a comparator circuit, means for feeding said corresponding characters from said storage circuits to said comparator circuit, an alarm device arranged to operate if said comparator circuit detects a difference between corresponding characters, a recording head for recording characters applied thereto on a magnetic recording medium, means for applying a character to said recording head if said comparator gives no indication of difference between that character and the reference version thereof, means responsive to said comparator detecting a difference to disable said play-out device, a storage circuit to which a further version of the disputed character is applied, comparisons being effected between said reference version and said further version of the disputed character, and means for applying the character to said recording head if said reference version and said further version are identical.

24. Apparatus as claimed in claim 23 and which comprises means for transferring the character extracted from said recording medium from said second storage circuit to said first storage circuit during said comparison, means for transferring said reference version character from said first storage circuit to said second storage circuit during said comparison, and means for inserting the further version of a disputed character, if any, in said first storage circuit, whereby the next comparison operation effects comparison between said reference version and said further version.

References Cited in the file of this patent

UNITED STATES PATENTS

| Number | Name | Date |
| --- | --- | --- |
| 2,052,844 | Prusso et al. | Sept. 1, 1936 |
| 2,074,392 | Herbst | Mar 23, 1937 |
| 2,117,052 | Bailey et al. | May 10, 1938 |
| 2,281,373 | Naes | Apr. 28, 1942 |
| 2,315,741 | Shafer | Apr. 6, 1943 |
| 2,418,521 | Morton et al. | Apr. 8, 1947 |
| 2,443,198 | Sallach | June 15, 1948 |
| 2,564,403 | May | Aug. 14, 1951 |
| 2,568,264 | Zenner | Sept. 18, 1951 |
| 2,579,329 | Blanton et al. | Nov. 20, 1951 |
| 2,611,026 | Blanton et al. | Sept. 16, 1952 |